US008235732B2

(12) United States Patent
Garascia et al.

(10) Patent No.: US 8,235,732 B2
(45) Date of Patent: Aug. 7, 2012

(54) BATTERY SYSTEM

(75) Inventors: Michael P. Garascia, Waterford, MI (US); Anthony P. Arena, Macomb Township, MI (US); Steven J. Wood, Shorewood, WI (US)

(73) Assignee: Johnson Controls—Saft Advanced Power Solutions LLC, Wilmington, DE (US)

( * ) Notice: Subject to any disclaimer, the term of this patent is extended or adjusted under 35 U.S.C. 154(b) by 0 days.

(21) Appl. No.: 12/944,506

(22) Filed: Nov. 11, 2010

(65) Prior Publication Data

US 2011/0111649 A1 May 12, 2011

Related U.S. Application Data

(63) Continuation of application No. PCT/US2009/043627, filed on May 12, 2009.

(60) Provisional application No. 61/053,474, filed on May 15, 2008, provisional application No. 61/055,407, filed on May 22, 2008, provisional application No. 61/055,896, filed on May 23, 2008, provisional application No. 61/080,645, filed on Jul. 14, 2008, provisional application No. 61/085,787, filed on Aug. 1, 2008.

(51) Int. Cl.
*H01R 12/00* (2006.01)
(52) U.S. Cl. .................. 439/76.2; 439/718; 439/500
(58) Field of Classification Search .................. 439/76.2, 439/718, 500
See application file for complete search history.

(56) References Cited

U.S. PATENT DOCUMENTS

| 2,403,979 | A | * | 7/1946 | Hill et al. ................... 439/718 |
| 3,044,036 | A | | 7/1962 | Herrmann |
| 3,113,820 | A | | 12/1963 | Norden |
| 3,936,133 | A | | 2/1976 | Splitt et al. |
| 3,967,163 | A | | 6/1976 | Cleaveland |
| 4,012,609 | A | | 3/1977 | Cleaveland |
| 4,025,741 | A | | 5/1977 | Albert |
| 4,115,630 | A | | 9/1978 | Van Ommering et al. |
| 4,119,816 | A | | 10/1978 | Davis |
| 4,139,429 | A | | 2/1979 | Steward et al. |
| 4,159,504 | A | | 6/1979 | Cook |

(Continued)

FOREIGN PATENT DOCUMENTS

DE 30 04 899 A1 8/1980

(Continued)

OTHER PUBLICATIONS

International Search Report and Written Opinion for International Application No. PCT/US2009/043627, dated Sep. 4, 2009, 16 pages.

*Primary Examiner* — Gary F. Paumen
(74) *Attorney, Agent, or Firm* — Foley & Lardner LLP

(57) ABSTRACT

A high voltage connector for a battery system includes an upper body having a first portion and a second portion. The first portion of the upper body is located internal to a battery system housing and configured to receive at least one contact from the battery system. The second portion is located external to the battery system housing and is configured to receive at least one contact from a vehicle. The high voltage connector also includes a lower body coupled to the upper body and at least one connecting member provided between the upper body and the lower body. The connecting member is configured to conductively connect the contact of the battery system to the contact of the vehicle.

20 Claims, 16 Drawing Sheets

U.S. PATENT DOCUMENTS

| | | |
|---|---|---|
| 4,181,583 A | 1/1980 | Steiger et al. |
| 4,181,584 A | 1/1980 | Steiger et al. |
| 4,205,238 A | 5/1980 | Shim et al. |
| 4,224,128 A | 9/1980 | Walton |
| 4,242,718 A | 12/1980 | Shariff et al. |
| 4,276,361 A | 6/1981 | Boudrot et al. |
| 4,332,648 A | 6/1982 | Spore |
| 4,343,965 A | 8/1982 | Deters et al. |
| 4,346,257 A | 8/1982 | Moss et al. |
| 4,358,633 A | 11/1982 | Reynolds, Jr. |
| 4,369,237 A | 1/1983 | Goebel |
| 4,389,466 A | 6/1983 | Joy |
| 4,407,903 A | 10/1983 | Gutbier et al. |
| 4,407,909 A | 10/1983 | Goebel |
| 4,409,730 A | 10/1983 | Goebel |
| 4,419,715 A | 12/1983 | Pear |
| 4,457,481 A | 7/1984 | Wagener |
| 4,475,226 A | 10/1984 | Greenberg |
| 4,517,064 A | 5/1985 | Cook |
| 4,564,798 A | 1/1986 | Young |
| 4,599,679 A | 7/1986 | Baader |
| 4,603,093 A | 7/1986 | Edwards et al. |
| 4,663,932 A | 5/1987 | Cox |
| 4,670,700 A | 6/1987 | Henkel |
| 4,707,591 A | 11/1987 | Sprenger |
| 4,721,862 A | 1/1988 | Cooper |
| 4,740,864 A | 4/1988 | Stanfield et al. |
| 4,746,585 A | 5/1988 | Stoner et al. |
| 4,787,011 A | 11/1988 | Stanfield et al. |
| 4,842,534 A | 6/1989 | Mobley et al. |
| 4,845,589 A * | 7/1989 | Weidler et al. ................ 361/614 |
| 5,021,014 A | 6/1991 | Walter et al. |
| 5,025,121 A | 6/1991 | Allen et al. |
| 5,030,108 A | 7/1991 | Babow et al. |
| 5,032,092 A | 7/1991 | Linn |
| 5,124,832 A | 6/1992 | Greenberg et al. |
| 5,154,989 A | 10/1992 | Howard et al. |
| 5,162,616 A | 11/1992 | Swaffield et al. |
| 5,213,518 A | 5/1993 | Weidler |
| 5,296,320 A | 3/1994 | Ginatta et al. |
| 5,336,097 A | 8/1994 | Williamson, Jr. et al. |
| 5,357,184 A | 10/1994 | McGowan et al. |
| 5,447,452 A | 9/1995 | Takano |
| 5,457,057 A | 10/1995 | Nath et al. |
| 5,517,381 A | 5/1996 | Guim et al. |
| 5,639,268 A | 6/1997 | Julian et al. |
| 5,643,693 A | 7/1997 | Hill et al. |
| 5,665,000 A | 9/1997 | Burrell et al. |
| 5,694,301 A | 12/1997 | Donegan et al. |
| 5,707,758 A | 1/1998 | Iwatsu et al. |
| 5,730,855 A | 3/1998 | Luebke et al. |
| 5,757,151 A | 5/1998 | Donegan et al. |
| 5,762,521 A | 6/1998 | Tanaka et al. |
| 5,783,050 A | 7/1998 | Coin et al. |
| 5,804,055 A | 9/1998 | Coin et al. |
| 5,804,761 A | 9/1998 | Donegan et al. |
| 5,828,554 A | 10/1998 | Donegan et al. |
| 5,847,321 A | 12/1998 | Carle et al. |
| 5,923,085 A | 7/1999 | Donegan et al. |
| 5,936,422 A | 8/1999 | Donegan et al. |
| 5,944,553 A | 8/1999 | Yasui et al. |
| 5,949,148 A | 9/1999 | Wagner |
| 5,969,938 A | 10/1999 | Byrne et al. |
| 5,972,181 A | 10/1999 | Coin et al. |
| 6,008,480 A | 12/1999 | Lund |
| 6,016,045 A | 1/2000 | Thomas et al. |
| 6,024,596 A | 2/2000 | Tanaka et al. |
| 6,026,773 A | 2/2000 | LaBelle |
| 6,038,156 A | 3/2000 | Inam et al. |
| 6,062,899 A | 5/2000 | Presley et al. |
| 6,080,290 A | 6/2000 | Stuart et al. |
| 6,090,502 A | 7/2000 | Ingram et al. |
| 6,146,518 A | 11/2000 | Fairlie et al. |
| 6,146,778 A | 11/2000 | Rouillard et al. |
| 6,152,785 A | 11/2000 | Haller et al. |
| 6,171,140 B1 | 1/2001 | Anbo et al. |
| 6,180,868 B1 | 1/2001 | Yoshino et al. |
| 6,186,806 B1 | 2/2001 | Suzuki et al. |
| 6,187,155 B1 | 2/2001 | Stuart et al. |
| 6,193,549 B1 | 2/2001 | Suzuki et al. |
| 6,205,029 B1 | 3/2001 | Byrne et al. |
| 6,222,439 B1 | 4/2001 | Tanigawa et al. |
| 6,238,225 B1 | 5/2001 | Middlehurst et al. |
| 6,242,708 B1 * | 6/2001 | Marchand et al. ............ 218/153 |
| 6,248,965 B1 | 6/2001 | Thomas |
| 6,254,741 B1 | 7/2001 | Stuart et al. |
| 6,273,700 B1 | 8/2001 | Takahashi |
| 6,290,521 B1 | 9/2001 | Suzuki et al. |
| 6,291,095 B1 | 9/2001 | Griffey et al. |
| 6,295,201 B1 | 9/2001 | Ogden et al. |
| 6,310,529 B1 | 10/2001 | Luetzow et al. |
| 6,313,991 B1 | 11/2001 | Nagashima et al. |
| 6,322,376 B1 | 11/2001 | Jetton |
| 6,334,315 B1 | 1/2002 | Kotliar |
| 6,338,786 B1 | 1/2002 | Thorpe et al. |
| 6,340,877 B1 | 1/2002 | Mita et al. |
| 6,365,085 B2 | 4/2002 | Takahashi |
| 6,373,015 B1 * | 4/2002 | Marchand et al. ............ 218/139 |
| 6,383,347 B1 | 5/2002 | Stuart et al. |
| 6,394,849 B2 | 5/2002 | Kasai |
| 6,395,154 B1 | 5/2002 | Stuart et al. |
| 6,402,569 B1 | 6/2002 | Spadoni et al. |
| 6,404,628 B1 | 6/2002 | Nagashima et al. |
| 6,420,655 B1 | 7/2002 | Yang et al. |
| 6,447,331 B1 | 9/2002 | Fukatsu et al. |
| 6,475,007 B2 | 11/2002 | Sugata |
| 6,538,878 B1 | 3/2003 | Acker et al. |
| 6,541,154 B2 | 4/2003 | Oogami et al. |
| 6,549,428 B1 | 4/2003 | Fontana et al. |
| 6,590,164 B2 | 7/2003 | Zachrai et al. |
| 6,638,412 B2 | 10/2003 | De Nora et al. |
| 6,641,942 B1 | 11/2003 | Rouillard et al. |
| 6,648,669 B1 | 11/2003 | Kim et al. |
| 6,664,478 B2 | 12/2003 | Mohan et al. |
| 6,669,511 B1 | 12/2003 | Yagi et al. |
| 6,672,914 B1 | 1/2004 | Claprood |
| 6,679,708 B1 | 1/2004 | Depp et al. |
| 6,689,956 B2 | 2/2004 | Alexander et al. |
| 6,691,809 B2 | 2/2004 | Hata et al. |
| 6,700,082 B1 | 3/2004 | Gibson et al. |
| 6,740,990 B2 | 5/2004 | Tozuka et al. |
| 6,762,362 B2 | 7/2004 | Cavanaugh et al. |
| 6,767,666 B2 | 7/2004 | Nemoto et al. |
| 6,797,018 B2 | 9/2004 | Rouillard et al. |
| 6,822,778 B2 | 11/2004 | Westfall et al. |
| 6,841,434 B2 | 1/2005 | Miyairi et al. |
| 6,844,110 B2 | 1/2005 | Enomoto et al. |
| 6,870,103 B1 | 3/2005 | Wiant et al. |
| 6,888,066 B1 | 5/2005 | Wiant et al. |
| 6,902,434 B2 | 6/2005 | Stack |
| 6,904,541 B1 | 6/2005 | MacArthur et al. |
| 6,913,484 B2 | 7/2005 | Soga et al. |
| 6,934,164 B2 | 8/2005 | Higuchi et al. |
| 6,948,982 B2 | 9/2005 | Higuchi et al. |
| 6,956,355 B2 | 10/2005 | Vaillancourt et al. |
| 6,961,168 B2 | 11/2005 | Agrawal et al. |
| 7,011,551 B2 | 3/2006 | Johansen et al. |
| 7,046,115 B2 | 5/2006 | Higuchi et al. |
| 7,052,299 B2 | 5/2006 | Kim et al. |
| 7,053,302 B2 | 5/2006 | Bjorklund et al. |
| 7,095,628 B2 | 8/2006 | Friedrich et al. |
| 7,108,943 B2 | 9/2006 | Yamakawa et al. |
| 7,118,827 B2 | 10/2006 | Kruger et al. |
| 7,119,937 B2 | 10/2006 | Warner et al. |
| 7,121,341 B2 | 10/2006 | Vinegar et al. |
| 7,132,832 B2 | 11/2006 | Vaillancourt et al. |
| 7,175,936 B2 | 2/2007 | Kawamura et al. |
| 7,189,474 B2 | 3/2007 | Hamada et al. |
| 7,192,319 B1 | 3/2007 | Rahman et al. |
| 7,198,499 B2 | 4/2007 | Kim et al. |
| 7,214,079 B2 | 5/2007 | Kim et al. |
| 7,229,320 B2 | 6/2007 | Saito et al. |
| 7,285,724 B2 | 10/2007 | Buettner |
| 7,334,315 B2 | 2/2008 | Wiant et al. |
| 7,347,696 B2 | 3/2008 | Yamamoto |
| 7,359,210 B2 | 4/2008 | Summers et al. |
| 7,360,588 B2 | 4/2008 | Vinegar et al. |

| | | |
|---|---|---|
| 7,369,397 B2 | 5/2008 | Yamamoto et al. |
| 7,372,692 B2 | 5/2008 | Ranta et al. |
| 7,378,179 B2 | 5/2008 | Shimamura et al. |
| 7,381,093 B2 | 6/2008 | Shimamori et al. |
| 7,396,262 B2 | 7/2008 | Korczynski et al. |
| 7,401,669 B2 | 7/2008 | Fujii et al. |
| 7,410,825 B2 | 8/2008 | Majumdar et al. |
| 7,424,926 B2 | 9/2008 | Tsuchiya |
| 7,435,037 B2 | 10/2008 | McKinzie, II |
| 7,438,989 B2 | 10/2008 | Watanabe |
| 7,477,505 B2 | 1/2009 | Timmerman et al. |
| 7,488,201 B2 | 2/2009 | Yoon et al. |
| 7,501,202 B2 | 3/2009 | Enomoto et al. |
| 7,504,179 B2 | 3/2009 | Tanjou et al. |
| 7,504,720 B2 | 3/2009 | Nakatsu et al. |
| 7,518,853 B2 | 4/2009 | Kato et al. |
| 2001/0049054 A1 | 12/2001 | Enomoto et al. |
| 2002/0031924 A1 | 3/2002 | Davis et al. |
| 2003/0096515 A1 | 5/2003 | Biermeier et al. |
| 2003/0214814 A1 | 11/2003 | Soga et al. |
| 2004/0018417 A1 | 1/2004 | Stack |
| 2005/0100785 A1 | 5/2005 | Enomoto et al. |
| 2005/0141228 A1 | 6/2005 | Soga et al. |
| 2005/0153583 A1 | 7/2005 | Kawamura et al. |
| 2005/0239318 A1 | 10/2005 | Newton, Jr. et al. |
| 2006/0012334 A1 | 1/2006 | Watson |
| 2006/0030176 A1 | 2/2006 | Ikeda et al. |
| 2006/0240694 A1 | 10/2006 | Buettner |
| 2008/0038947 A1 | 2/2008 | Wagener |
| 2008/0113250 A1 | 5/2008 | Joos et al. |
| 2008/0128150 A1 | 6/2008 | Kimmel |
| 2008/0257602 A1 | 10/2008 | Wagener |
| 2008/0266760 A1 | 10/2008 | Wagener |

FOREIGN PATENT DOCUMENTS

| | | |
|---|---|---|
| DE | 31 43 518 A1 | 5/1983 |
| EP | 1 006 597 B1 | 6/2000 |
| GB | 2 112 586 A | 7/1983 |

* cited by examiner

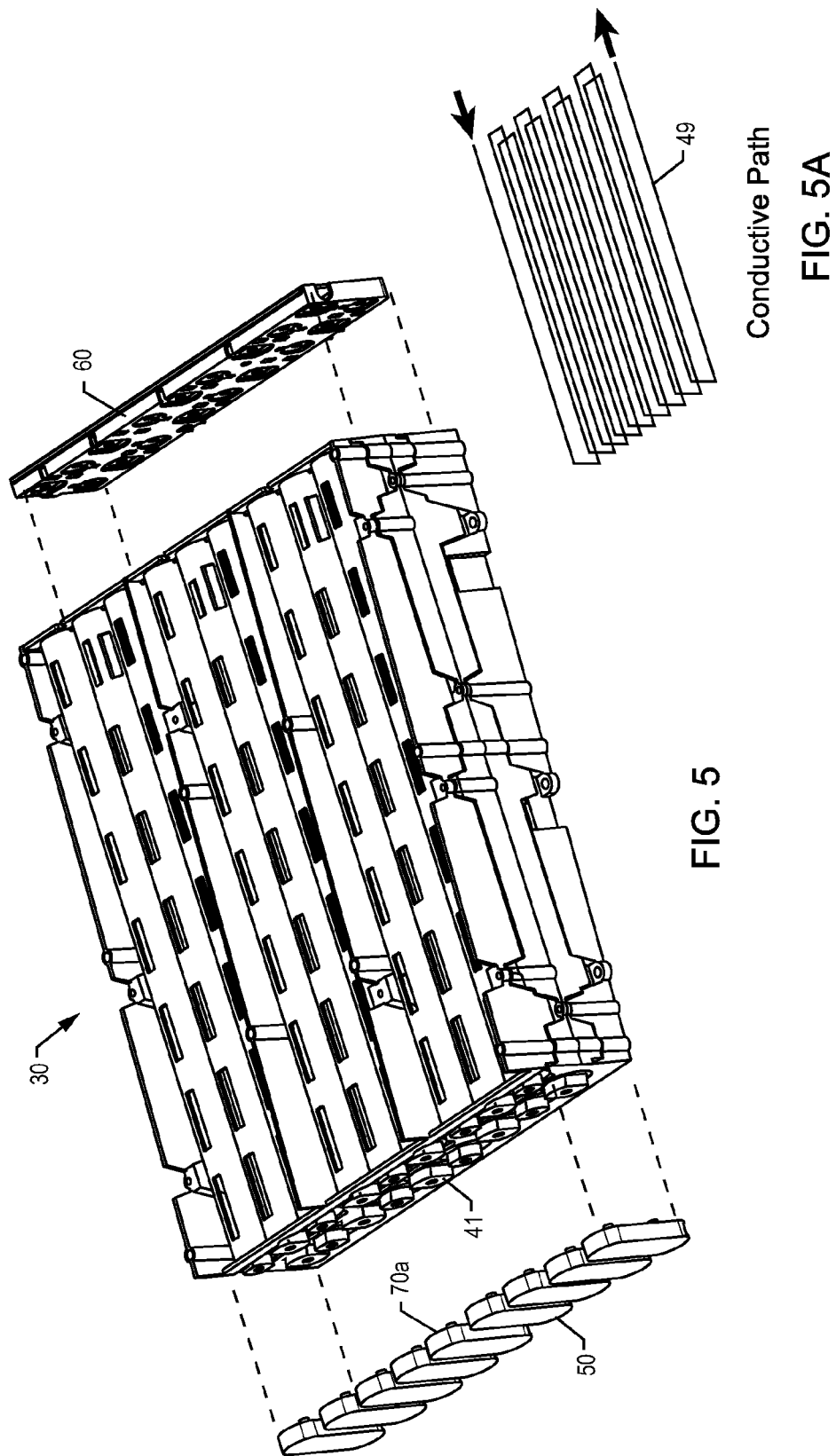

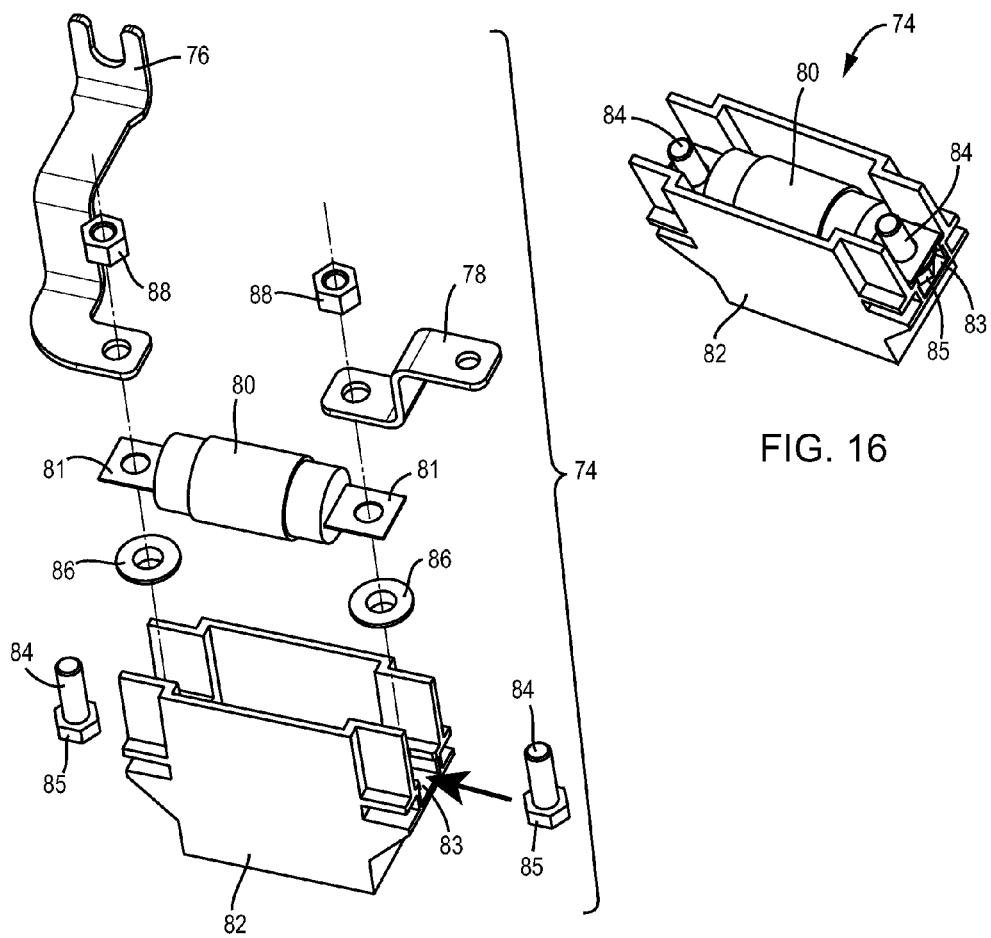
FIG. 16
FIG. 15
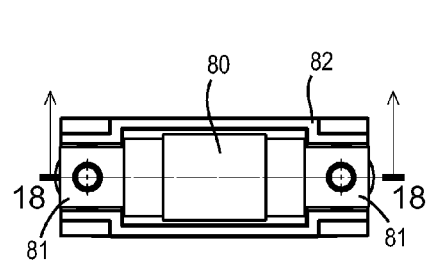
FIG. 17
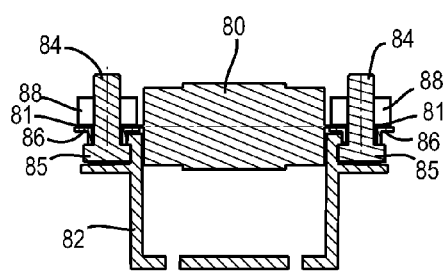
FIG. 18

BATTERY SYSTEM

CROSS-REFERENCE TO RELATED PATENT APPLICATIONS

This application is a continuation of International Patent Application No. PCT/US2009/043627, filed May 12, 2009, which claims priority to and the benefit of the following patent applications: U.S. Provisional Patent Application No. 61/053,474, filed May 15, 2008; U.S. Provisional Patent Application No. 61/055,407, filed May 22, 2008; U.S. Provisional Patent Application No. 61/055,896, filed May 23, 2008; U.S. Provisional Patent Application No. 61/080,645, filed Jul. 14, 2008; and U.S. Provisional Patent Application No. 61/085,787, filed Aug. 1, 2008.

The entire disclosures of the following patent applications are incorporated by reference herein: International Patent Application No. PCT/US2009/043627, filed May 12, 2009; U.S. Provisional Patent Application No. 61/053,474, filed May 15, 2008; U.S. Provisional Patent Application No. 61/055,407, filed May 22, 2008; U.S. Provisional Patent Application No. 61/055,896, filed May 23, 2008; U.S. Provisional Patent Application No. 61/080,645, filed Jul. 14, 2008; and U.S. Provisional Patent Application No. 61/085,787, filed Aug. 1, 2008.

BACKGROUND

The present application relates generally to the field of batteries and battery systems. More specifically, the present application relates to batteries and battery systems that may be used in vehicle applications to provide at least a portion of the motive power for the vehicle.

Vehicles using electric power for all or a portion of their motive power (e.g., electric vehicles (EVs), hybrid electric vehicles (HEVs), plug-in hybrid electric vehicles (PHEVs), and the like, collectively referred to as "electric vehicles") may provide a number of advantages as compared to more traditional gas-powered vehicles using internal combustion engines. For example, electric vehicles may produce fewer undesirable emission products and may exhibit greater fuel efficiency as compared to vehicles using internal combustion engines (and, in some cases, such vehicles may eliminate the use of gasoline entirely, as is the case of certain types of PHEVs).

As electric vehicle technology continues to evolve, there is a need to provide improved power sources (e.g., battery systems or modules) for such vehicles. For example, it is desirable to increase the distance that such vehicles may travel without the need to recharge the batteries. It is also desirable to improve the performance of such batteries and to reduce the cost associated with the battery systems.

One area of improvement that continues to develop is in the area of battery chemistry. Early electric vehicle systems employed nickel-metal-hydride (NiMH) batteries as a propulsion source. Over time, different additives and modifications have improved the performance, reliability, and utility of NiMH batteries.

More recently, manufacturers have begun to develop lithium-ion batteries that may be used in electric vehicles. There are several advantages associated with using lithium-ion batteries for vehicle applications. For example, lithium-ion batteries have a higher charge density and specific power than NiMH batteries. Stated another way, lithium-ion batteries may be smaller than NiMH batteries while storing the same amount of charge, which may allow for weight and space savings in the electric vehicle (or, alternatively, this feature may allow manufacturers to provide a greater amount of power for the vehicle without increasing the weight of the vehicle or the space taken up by the battery system).

It is generally known that lithium-ion batteries perform differently than NiMH batteries and may present design and engineering challenges that differ from those presented with NiMH battery technology. For example, lithium-ion batteries may be more susceptible to variations in battery temperature than comparable NiMH batteries, and thus systems may be used to regulate the temperatures of the lithium-ion batteries during vehicle operation. The manufacture of lithium-ion batteries also presents challenges unique to this battery chemistry, and new methods and systems are being developed to address such challenges.

It would be desirable to provide an improved battery module and/or system for use in electric vehicles that addresses one or more challenges associated with NiMH and/or lithium-ion battery systems used in such vehicles. It also would be desirable to provide a battery module and/or system that includes any one or more of the advantageous features that will be apparent from a review of the present disclosure.

SUMMARY

According to an exemplary embodiment, a high voltage connector for a battery system includes an upper body having a first portion and a second portion. The first portion of the upper body is located internal to a battery system housing and configured to receive at least one contact from the battery system. The second portion is located external to the battery system housing and is configured to receive at least one contact from a vehicle. The high voltage connector also includes a lower body coupled to the upper body and at least one connecting member provided between the upper body and the lower body. The connecting member is configured to conductively connect the contact of the battery system to the contact of the vehicle.

According to another exemplary embodiment, a fuse holder for use in a battery system includes a housing configured to retain a fuse. The housing includes at least one slot configured to retain a first end of a fastener such that the slot substantially restricts rotational movement of the fastener. The fastener is configured to secure the fuse within the housing.

According to another exemplary embodiment, a method of assembling bus bars to a battery module includes providing a plurality of electrochemical cells in a battery module. Each of the cells has a terminal extending from an end thereof. At least a portion of the cells have a terminal extending from a first side of the battery module and at least a portion of the cells have a terminal extending from the second side of the battery module. The method also includes providing a tray that is configured to receive a plurality of bus bars, the tray having a cover provided in an open position. The method further includes securing a plurality of bus bars to the tray. The method still further includes positioning the tray such that apertures in the plurality of bus bars are aligned with the terminals of the cells provided at the first side of the battery module so that the terminals may be substantially simultaneously coupled to all of the bus bars in the tray. The method also includes coupling the terminals to the plurality of bus bars. The method also includes closing the cover of the tray. The method also includes coupling individual bus bars to the terminals of the cells on the second side of the battery module starting from the outside of the battery module and working to the inside of the battery module. The method also includes providing a bus bar cover over each of the individual bus bars on the second side of the battery module as the individual bus bar is coupled to the battery module.

BRIEF DESCRIPTION OF THE DRAWINGS

FIG. 5 is an exploded perspective view showing bus bars being coupled to the battery module shown in FIG. 4 according to an exemplary embodiment.

FIG. 5A is a schematic diagram of the conductive path through the battery module shown in FIG. 4 according to an exemplary embodiment.

FIG. 15 is an exploded perspective view of a fuse block assembly included in the battery disconnect unit shown in FIG. 14 according to an exemplary embodiment.

FIG. 16 is a perspective view of the fuse block assembly shown in FIG. 15.

FIG. 17 is a top plan view of the fuse block assembly shown in FIG. 15.

FIG. 18 is a cross-sectional view of the fuse block assembly taken along line 18-18 of FIG. 17.

DETAILED DESCRIPTION

Figure 1:
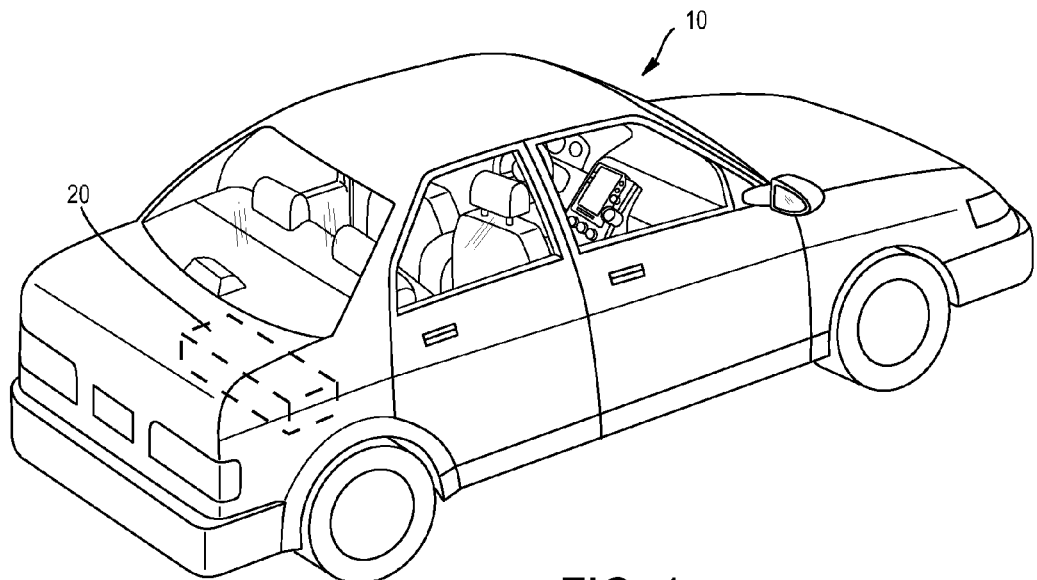
FIG. 1 is a perspective view of a vehicle including a battery module according to an exemplary embodiment.

FIG. 1 is a perspective view of a vehicle 10 in the form of an automobile (e.g., a car) having a battery system 20 for providing all or a portion of the motive power for the vehicle 10. Such a vehicle 10 can be an electric vehicle (EV), a hybrid electric vehicle (HEV), a plug-in hybrid electric vehicle (PHEV), or other type of vehicle using electric power for propulsion (collectively referred to as "electric vehicles").

Although the vehicle 10 is illustrated as a car in FIG. 1, the type of vehicle may differ according to other exemplary embodiments, all of which are intended to fall within the scope of the present disclosure. For example, the vehicle 10 may be a truck, bus, industrial vehicle, motorcycle, recreational vehicle, boat, or any other type of vehicle that may benefit from the use of electric power for all or a portion of its propulsion power.

Although the battery system 20 is illustrated in FIG. 1 as being positioned in the trunk or rear of the vehicle, according to other exemplary embodiments, the location of the battery system 20 may differ. For example, the position of the battery system 20 may be selected based on the available space within a vehicle, the desired weight balance of the vehicle, the location of other components used with the battery system 20 (e.g., battery management systems, vents or cooling devices, etc.), and a variety of other considerations.

Figure 2:
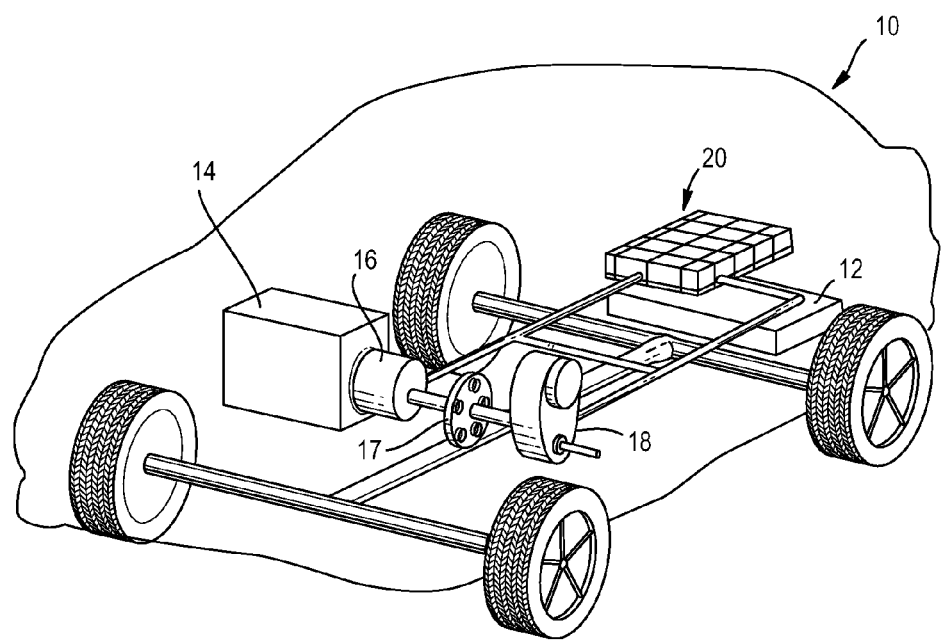
FIG. 2 is a perspective cutaway schematic view of a vehicle provided in the form of a hybrid electric vehicle (HEV) according to an exemplary embodiment.

FIG. 2 illustrates a cutaway schematic view of a vehicle 10 provided in the form of an HEV according to an exemplary embodiment. A battery system 20 is provided toward the rear of the vehicle 10 proximate a fuel tank 12 (the battery system 20 may be provided immediately adjacent the fuel tank 12 or may be provided in a separate compartment in the rear of the vehicle 10 (e.g., a trunk) or may be provided elsewhere in the vehicle 10). An internal combustion engine 14 is provided for times when the vehicle 10 utilizes gasoline power to propel the vehicle 10. An electric motor 16, a power split device 17, and a generator 18 are also provided as part of the vehicle drive system. Such a vehicle 10 may be powered or driven by just the battery system 20, by just the engine 14, or by both the battery system 20 and the engine 14. It should be noted that other types of vehicles and configurations for the vehicle electrical system may be used according to other exemplary embodiments, and that the schematic illustration of FIG. 2 should not be considered to limit the scope of the subject matter described in the present application.

According to various exemplary embodiments, the size, shape, and location of the battery system 20, the type of vehicle 10, the type of vehicle technology (e.g., EV, HEV, PHEV, etc.), and the battery chemistry, among other features, may differ from those shown or described.

Figure 3:
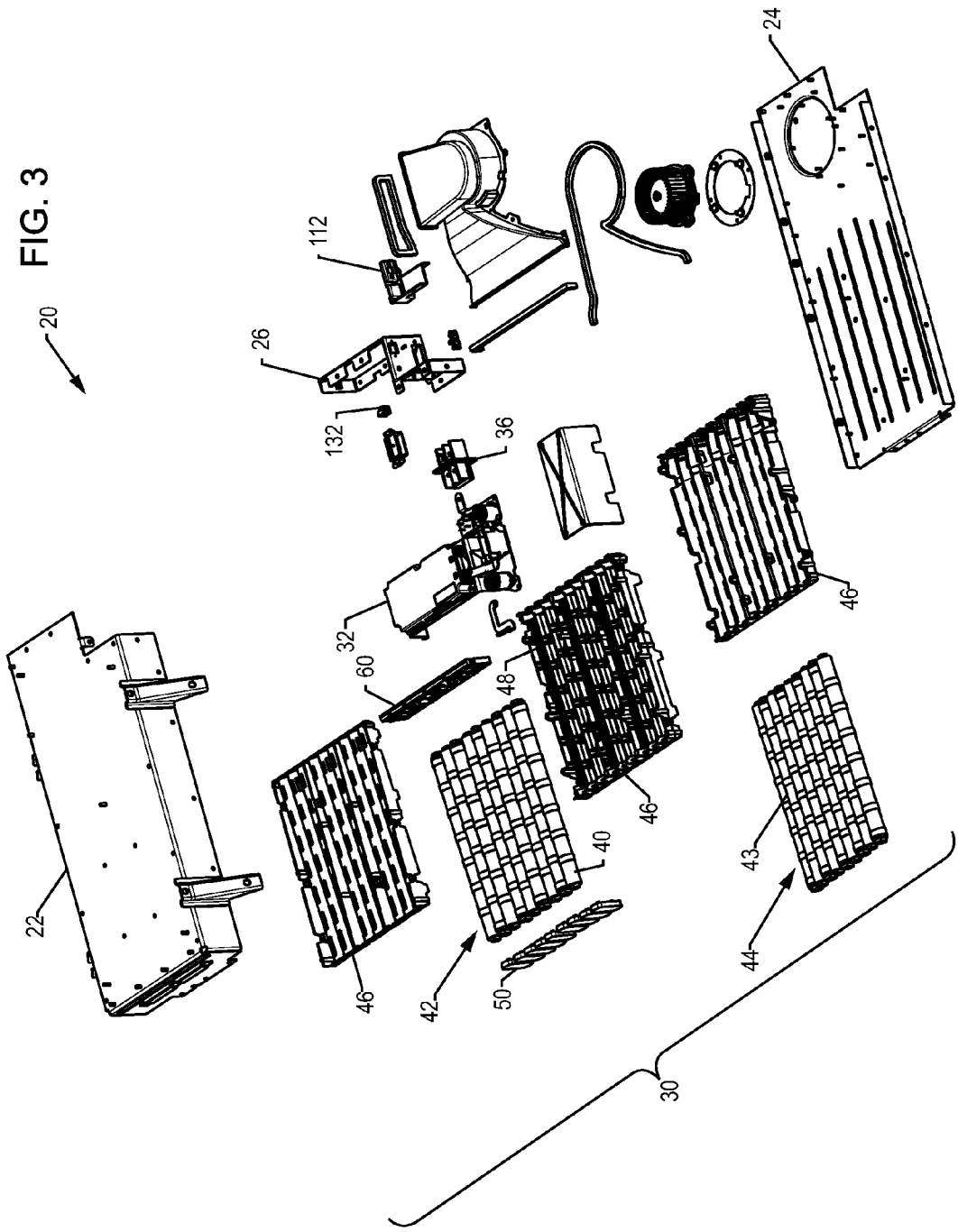
FIG. 3 is an exploded perspective view of a battery system according to an exemplary embodiment.

Referring to FIG. 3, an exploded view of a battery system 20 is shown according to an exemplary embodiment. The battery system 20 includes a plurality of electrochemical cells or batteries 40 (e.g., lithium-ion cells, nickel-metal-hydride cells, lithium polymer cells, etc., or other types of electrochemical cells now known or hereafter developed). According to an exemplary embodiment, the electrochemical cells 40 are generally cylindrical nickel-metal-hydride cells configured to store an electrical charge. According to other exemplary embodiments, the cells 40 could have other physical configurations (e.g., oval, prismatic, polygonal, etc.). The capacity, size, design, and other features of the cells 40 may also differ from those shown according to other exemplary embodiments.

The components of the battery system 20 are contained in an insulative enclosure or container, shown in FIG. 3 as being formed by a cover 22, a base plate 24, and an end cap 26. The cover 22, base plate 24, and end cap 26 are formed from a polymer or other non-conductive material and may be coupled together with a variety of mechanisms including threaded fasteners, integrally formed latches or snaps, pins, etc. As described in greater detail below, disconnect functionality for the battery system 20 may be built into the cover 22, base plate 24, and/or end cap 26.

According to an exemplary embodiment, the battery system 20 includes a battery module 30 that packages or contains the electrochemical cells 40, connects the electrochemical cells 40 to each other and/or to other components of the vehicle electrical system, and regulates the electrochemical cells 40 and other features of the battery system 20. The battery system 20 may include features that are responsible for monitoring and controlling the electrical performance of the system, managing the thermal behavior of the system, containment and/or routing of effluent (e.g., gases that may be vented from a cell), and other aspects of the battery system 20.

While FIG. 3 shows an exemplary embodiment of a battery system 20, it should be understood that the battery system 20 is not limited to any particular arrangement as will be appreciated by those reviewing this disclosure. For instance, while the battery system 20 shown in FIG. 3 is shown with horizontally oriented cells 40 arranged in rows or sticks in two layers or groups by parallel frame members, it should be understood that the battery module may have many different configurations. For example, the cells may also be generally vertical, be several separate groups, or arranged in other configurations. Furthermore, different numbers and types (e.g., nickel-metal-hydride, etc.) of cells may be used.

Figure 4:
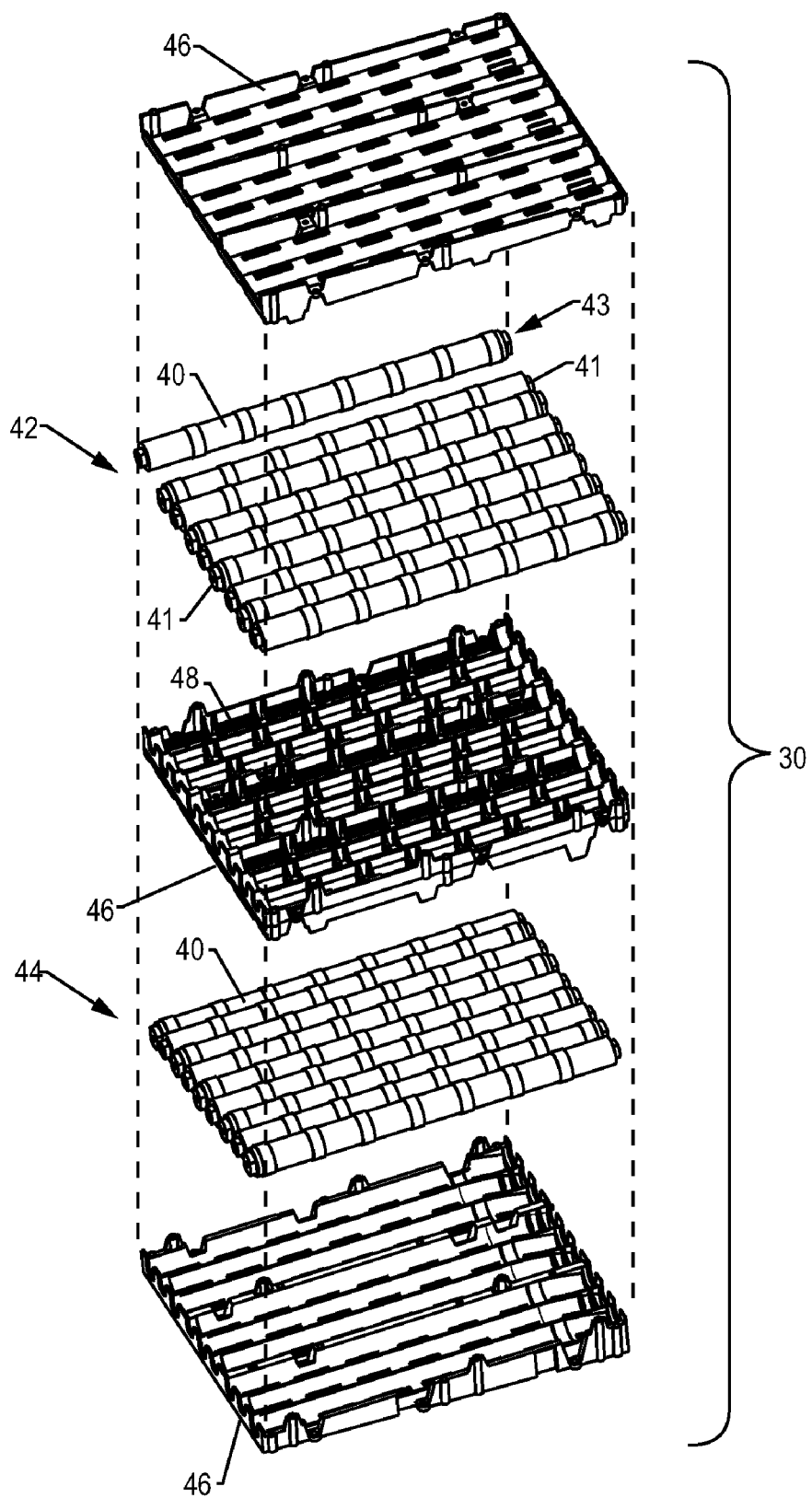
FIG. 4 is an exploded perspective view of a battery pack, assembly, or module according to an exemplary embodiment.
Figure 7:
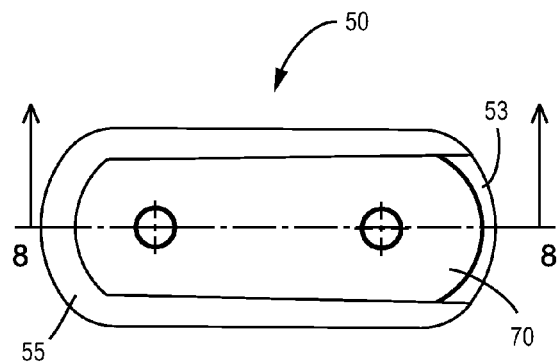
FIG. 7 is a bottom view of the bus bar assembly shown in FIG. 6.
Figure 6:
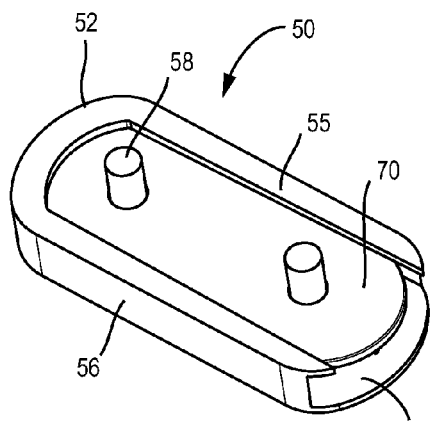
FIG. 6 is a perspective view of a bus bar assembly for the battery module shown in FIG. 5 according to an exemplary embodiment.
Figure 8:
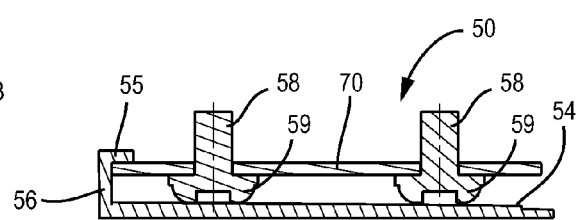
FIG. 8 is a cross-sectional view of the bus bar assembly taken along line 8-8 of FIG. 7.
Figure 9:
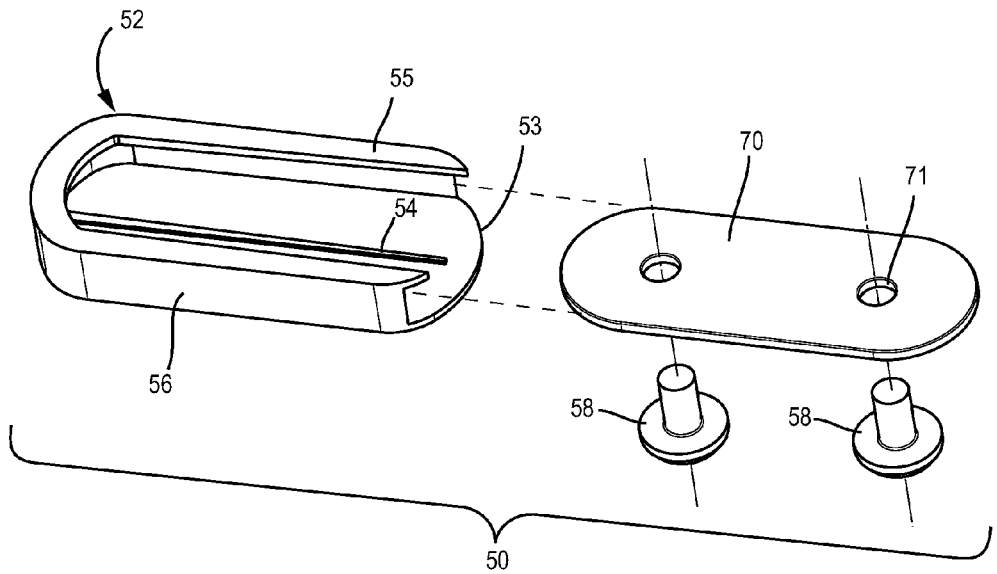
FIG. 9 is an exploded perspective view of the bus bar assembly shown in FIG. 6.

As shown in FIG. 4, according to an exemplary embodiment, the battery module 30 includes two layers 42, 44 of cells 40, and a plurality of trays 46. The first layer 42 and the second layer 44 each include a plurality of rows of cells 40. The cells 40 in each row are coupled end-to-end with adjacent cells 40 to form rods or sticks 43. The cell sticks 43 are received in troughs 48 formed in the trays 46. The trays 46 may also include plenum airspaces or other features to provide cooling air to the cells 40 or to isolate and direct away from the vehicle 10 any vent gasses from malfunctioning cells. The trays 46 are made of a polymeric material or other suitable material (e.g., electrically insulative materials). The trays 46 may also include features to provide spacing of the cells away from the surface of the trays and/or from adjacent cells.

Although illustrated in FIGS. 3 and 4 as having a particular number of electrochemical cells 40, it should be noted that according to other exemplary embodiments, the battery system 20 may have a different number and/or arrangement of electrochemical cells 40 depending on any of a variety of considerations (e.g., the desired power for the battery system, the available space within which the battery system must fit, etc.).

A plurality of electrical connectors provided in the form of bus bars 70 (e.g., as shown in FIGS. 5-12) are provided to electrically couple the cells 40 together in a circuit. FIG. 5 shows one exemplary embodiment in which one side of the battery module 30 includes a bus bar container or carrier 60 having a first set of generally horizontally oriented bus bars to couple a cell stick 43 to an adjacent cell stick 43 on the same layer while the opposite side of the cell assembly includes a plurality of bus bar assemblies 50 having a second set of generally vertical bus bars to couple a cell stick 43 on the first layer 42 with a vertically aligned cell stick 43 on the second layer 44. In another exemplary embodiment, the second set of bus bars may be housed in a second bus bar carrier or container. The bus bar assemblies 50 and the bus bar carrier 60 couple the cells 40 in the battery module 30 together to form a continuous conductive path 49, one example of which is shown in FIG. 5A.

One exemplary bus bar assembly 50 including a bus bar 70 and a cover 52 is shown in FIGS. 6-9 in more detail. The bus bar 70 is a metallic member that conductively couples adjacent cells 40 together. The bus bar 70 includes apertures or holes 71 through which a fastener 58 such as a screw may pass to couple the bus bar 70 to a terminal 41 of the cell 40. Instead of using a single cover to cover all the bus bars 70 after all the bus bars 70 are installed on the side of the battery module 30, according to an exemplary embodiment (e.g., as shown in FIGS. 6-9), each bus bar assembly 50 includes a cover 52 that is sized to cover an individual bus bar 70 and may be coupled to the bus bar 70 immediately after it is coupled to the cells 40.

The cover 52 is formed from a non-conductive material such as a polymeric material (e.g., polypropylene, polyethylene, etc.) and has an open end 53 to slide over the bus bar 70 and fasteners 58. The cover 52 has a generally U-shaped or horseshoe shaped cross-section with an outer wall 56 that surrounds the sides of the bus bar 70. A lip or rim 55 protruding inward from the outer wall 56 contacts the back side of the bus bar 70 to help hold the cover 52 onto the bus bar 70. A rib 54 extends from the top wall of the cover. According to an exemplary embodiment, the rib 54 is integrally formed with the cover 52. The distance from the rib 54 to the lip 55 is less than the distance from the top of a head 59 of the screw 58 to the bottom of the bus bar 70 so that when the cover 52 is slid onto the bus bar 70 and fasteners 58, an interference fit is formed. The interference fit reduces the chance that the cover 52 will shake loose from the bus bar 70 in response to vibrational forces.

Figure 10:
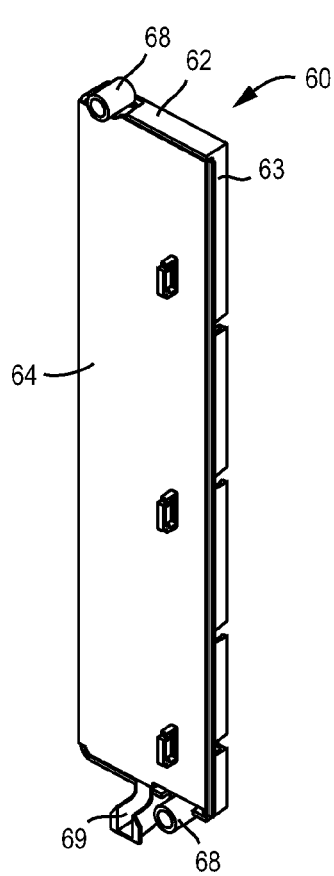
FIG. 10 is a perspective view of a bus bar carrier for the battery module shown in FIG. 5 according to an exemplary embodiment.
Figure 11:
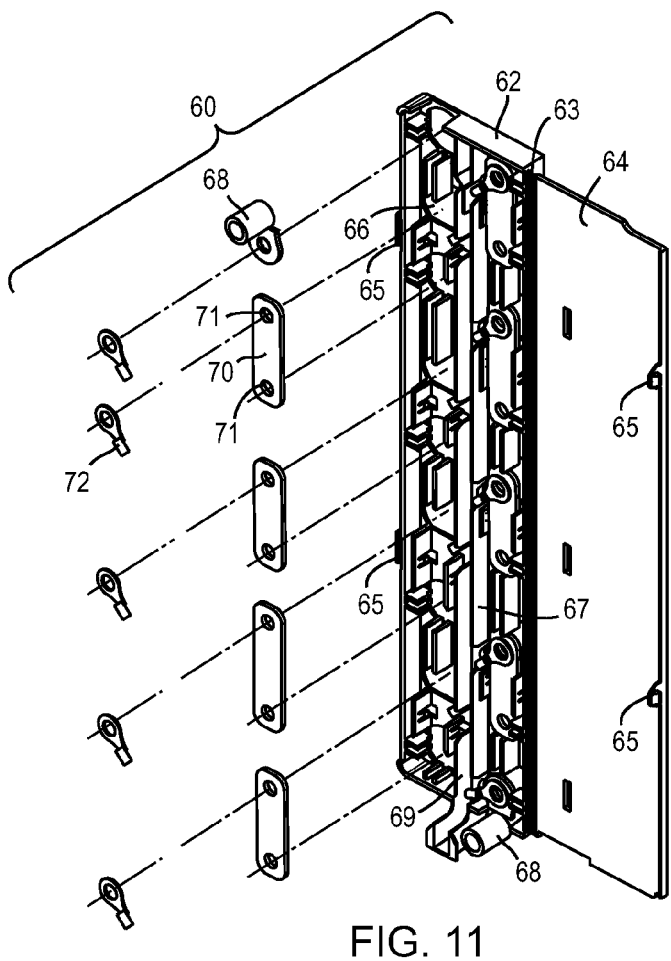
FIG. 11 is a partial exploded perspective view of the bus bar carrier shown in FIG. 10.
Figure 12:
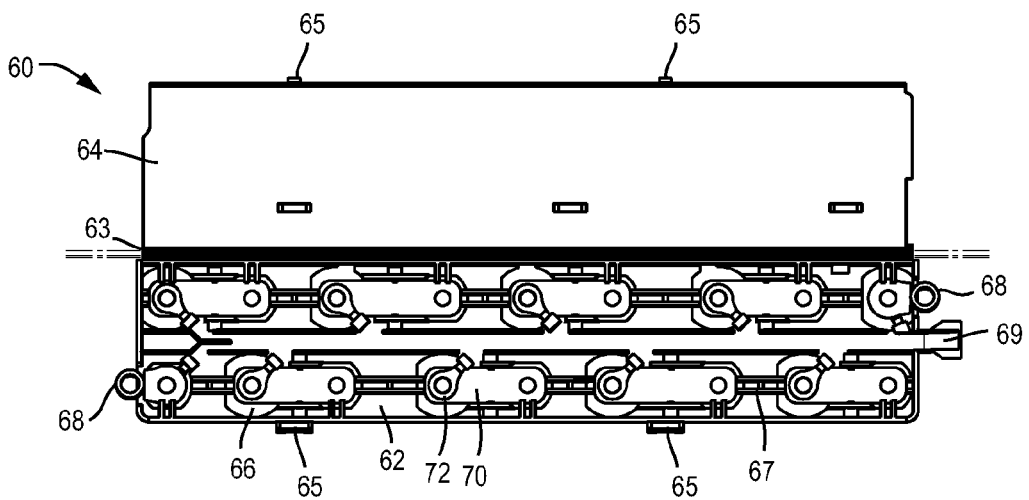
FIG. 12 is a top plan view of the bus bar carrier shown in FIG. 10.

One exemplary bus bar carrier 60 is shown in FIGS. 10-12 in more detail. The bus bar carrier 60 is configured to hold a plurality of bus bars 70 and a plurality of sensor terminals 72 in a closed package. The bus bar carrier 60 can be assembled with the battery module 30 (as shown in FIG. 5) to simultaneously electrically couple the cells 40 together while preventing accidental contact with electrical components of the battery system 20. According to one exemplary embodiment, the bus bar carrier 60 is formed as a single body from a non-conductive polymer such as polypropylene, polyethylene, high heat ABS, or any other suitable polymeric material. The bus bar carrier 60 may be produced by injection molding or another suitable process.

According to one exemplary embodiment, the carrier 60 includes a main compartment or tray 62 and a lid 64 that is integrally formed with the tray 62. The lid 64 pivots on an integrally formed living hinge 63 (e.g., formed by an area of reduced thickness in the polymer material) and is fastened in the closed position with one or more fastening features, shown as snap-fit connections 65 in FIGS. 10-12.

According to other exemplary embodiments, the lid 64 may be otherwise hinged or coupled to the tray. For instance, the lid 64 may pivot relative to the tray 62 by other than a living hinge (e.g., by an in-molded fabric hinge, a separate hinge formed from a polymer, metal, or other suitable material, etc.). In another exemplary embodiment, the lid 64 may be provided as a separate cover. For instance, the lid 64 may be coupled to the tray 62 with a snap-fit connection, with a tongue and groove connection, or with fasteners, hooks, etc.

The bus bars 70 are metallic members that conductively couple adjacent cells 40. Each bus bar 70 includes holes 71 through which a fastener such as a screw or bolt (not shown in FIGS. 10-12) may pass to couple the bus bar 70 to a terminal 41 of the cell 40 (the terminal 41 having internal threads to receive the fastener). While the bus bars 70 shown in FIGS. 6-12 are generally identical in shape and size, according to other exemplary embodiments, the bus bars received by the carrier 60 may differ in size and shape from the bus bars in the individual bus bar assemblies 50. Further, the assemblies 50 and/or the carrier 60 may each comprise bus bars of multiple shapes and/or sizes, for example, to create a different conductive path through the battery module 30 or to compensate for a differently shaped battery module 30.

Openings 66 in the tray 62 (shown, e.g., in FIG. 11) allow the cell terminals 41 to pass through the tray 62 for coupling to the bus bars 70. The tray 62 includes interior dividers or walls 67 to isolate the bus bars 70 from each other so they do not touch and form a short circuit. Terminal connectors or rings 68 are provided on either side of the conductive path 49 to receive connectors that couple the battery module 30 to the vehicle's electrical system. The terminal connectors 68 extend from opposite ends of the carrier 60 through openings in the side walls.

The bus bar carrier 60 is further configured to house a plurality of sensor terminals 72. The sensor terminals 72 are connected on one end thereof to various portions of the conductive path 49 (e.g., coupled to bolts or other fasteners that couple the bus bars 70 to the terminals 41 of the cells 40) of the battery module 30 and on the opposite end to the battery management system (BMS) 34 of the battery disconnect unit (BDU) 32. The sensor terminals 72 are provided to monitor various aspects of the cells 40 (e.g., temperature, current, voltage, etc.) at various points along the conductive path 49. A wiring trough 69 is provided between the two rows of bus bars 70 to collect (e.g., contain, hold, etc.) the sensor wires (not shown). Collecting the sensor wires (e.g., into a standardized wiring harness) simplifies the packaging and assembly of the battery module 30 and allows the bus bars 70 to be more easily accessed. While the trough 69 is shown located generally in the center of the carrier 60, according to other exemplary embodiments, the trough 69 may be provided elsewhere on the carrier 60, such as, for example, along one side of the carrier 60 or on the outside surface of the carrier 60.

The battery module 30 of FIG. 5 is generally assembled by first arranging rows of cells 40 (e.g., the cell sticks 43) in the trays 46. The trays 46 are stacked such that only the terminals 41 on the ends of each row of cells 40 are exposed. According to one exemplary embodiment, the bus bar carrier 60 includes features (e.g., snap-fit features) to retain the bus bars 70 and the sensor terminals 72 within the bus bar carrier 60. By providing features to retain the bus bars 70 and the sensor terminals 72, the bus bars 70 and sensor terminals 72 can be pre-assembled in the bus bar carrier 60 prior to assembly to the battery module 30. The pre-assembled bus bar carrier 60 can then be coupled to the battery module 30 in a quick and simple fashion.

Figure 13:
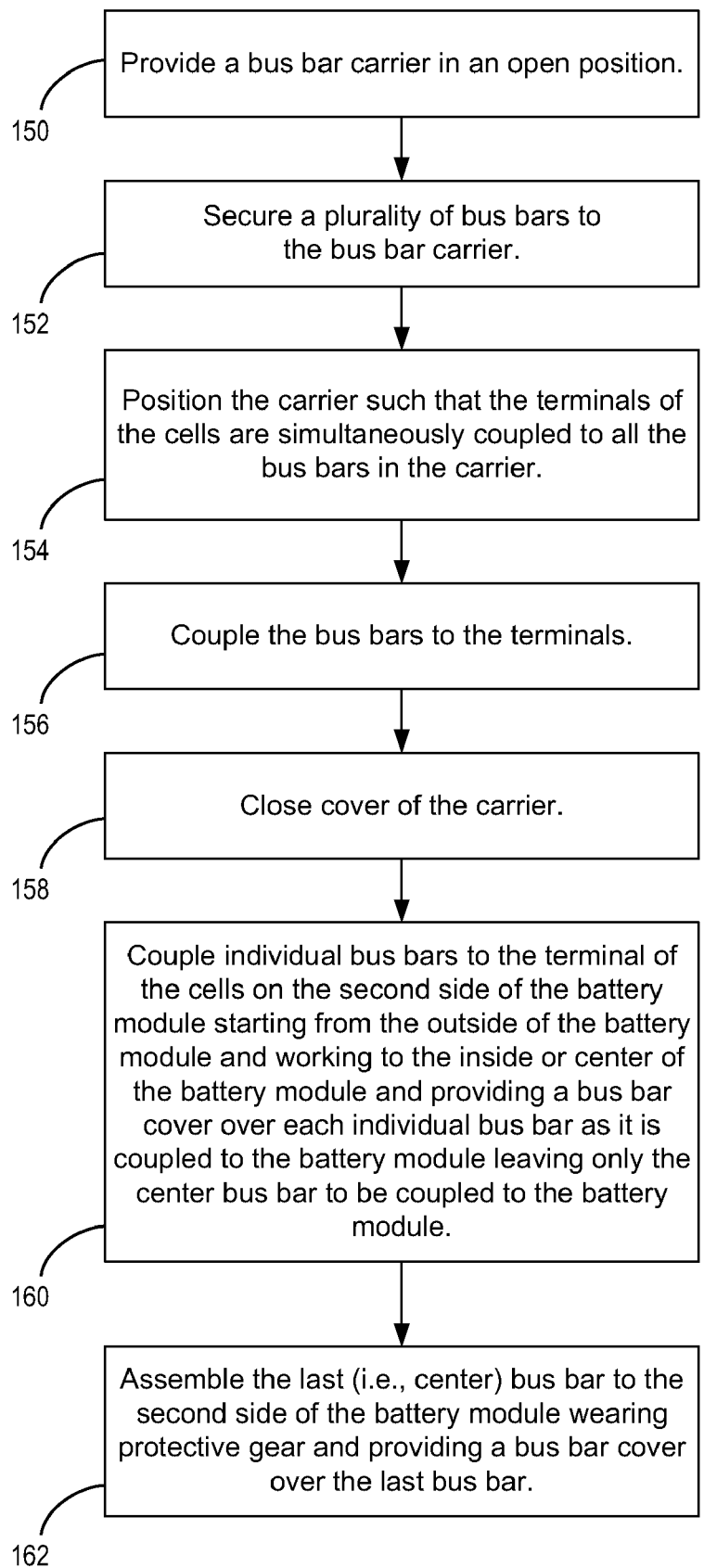
FIG. 13 is a flow chart of a method of assembling bus bars to a battery module according to an exemplary embodiment.

Referring now to FIG. 13, a flow chart outlining a method of assembling the bus bar assemblies 50, bus bar carrier 60, and battery module 30 is shown according to an exemplary embodiment. In a first step 150 the bus bar carrier 60 is opened (i.e., the lid 64 is opened, revealing the interior of the main compartment 62). In a second step 152, the bus bars 70 are inserted into the carrier 60 and may be held in place with snap features or interference fits. In a third step 154, the pre-assembled bus bar carrier 60 is positioned over the cell terminals 41, substantially simultaneously making contact between all the bus bars 70 in the carrier 60 and the terminals 41 on one side of the battery module 30. In a fourth step 156, the bus bars 70 are coupled to the terminals 41 with bolts or other fasteners. In a fifth step 158, the lid 64 of the carrier 60 is closed, effectively isolating the bus bars 70 held in the carrier 60 from a person assembling the battery module 30.

After the bus bars 70 in the bus bar carrier 60 are coupled to the terminals 41 on the first side of the battery module 30 and the lid 64 of the carrier 60 is closed, in a sixth step 160, individual bus bars 70 are then coupled to the terminals 41 of the cells 40 on the second side of the battery module 30. In an exemplary embodiment, individual bus bars 70 are coupled to the second side of the battery module 30 starting from the outside of the battery module 30 and working to the inside or center of the battery module 30. With this assembly process, the complete conductive path 49 of the battery module 30 is not fully completed or connected until the final or center bus bar 70a is coupled to the cell terminals 41 on the second side of the battery module 30. Leaving the center bus bar 70a to be connected last in the assembly process essentially "splits" the conductive path 49 of the battery module 30 in half, leaving two lower voltage banks of cells 40. In a seventh step 162, the center bus bar 70a is connected to the cell terminals 41 on the second side of the battery module 30 with an automated process or by a person wearing protective gear to connect the two halves of the conductive path 49 of the battery module 30 together. The battery module 30 is not active or in a "high voltage" state until the center bus bar 70a is coupled to the battery module 30.

According to another exemplary embodiment, a second bus bar carrier may be utilized on the second side of the battery module 30 instead of using individual bus bars 70 so that both sides of the battery module 30 utilize bus bar carriers.

Figure 14:
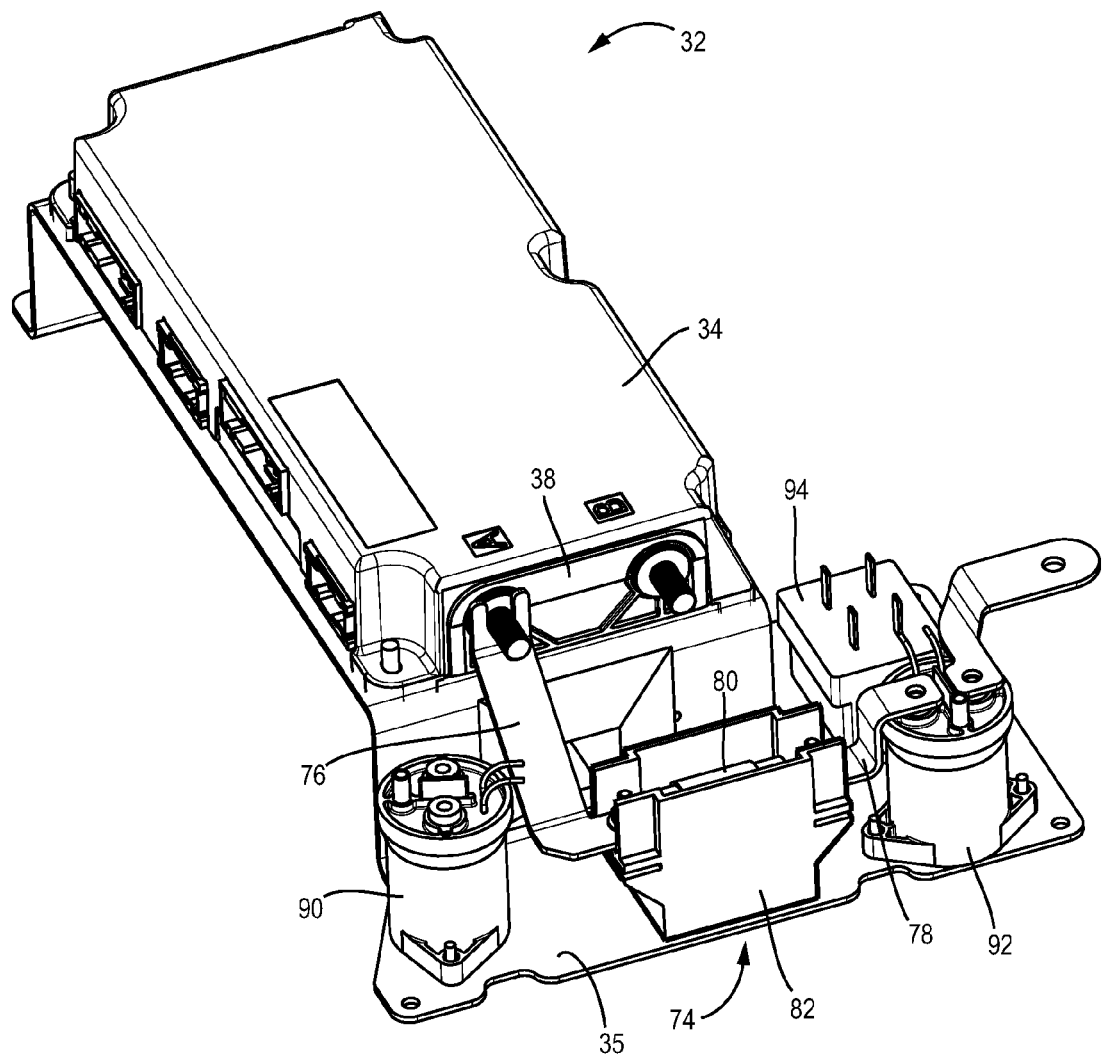
FIG. 14 is a perspective view of a battery disconnect unit included in the battery system shown in FIG. 3.

Referring now to FIG. 14, a battery disconnect unit (BDU) 32 for the battery system 20 is shown according to an exemplary embodiment. The BDU 32 includes an electronic control unit shown as a battery management system (BMS) 34 that regulates the current, voltage, and/or temperature of cells 40 in a battery module 30. A shunt 38 is electrically coupled to the BMS 34 and to a high voltage connector 36 and an electrical system of the vehicle 10 through a fuse assembly 74. The fuse assembly 74 includes a fuse 80 that is isolated and insulated from the BMS bracket 35 by a fuse block 82. The fuse assembly 74 is coupled to the shunt on one end with a first bus bar 76, and to a contactor 92 with a second bus bar 78.

FIGS. 15-18 show the fuse block 82 and related components according to an exemplary embodiment in more detail. The fuse block 82 is a mounting member formed from a non-conductive material such as a polymeric material (e.g., polypropylene, polyethylene, etc.) or other suitable material. The fuse block 82 receives a fuse 80 including two ends 81 (e.g., flanges, arms, etc.) that include holes or apertures.

Rather than a multi-piece component or a component that includes custom threaded parts or clips, the fuse block 82 shown in FIGS. 15-18 is a relatively simple single-body component that includes slots 83 to hold two commonly found (off-the-shelf) fastening components such as hex bolts 84.

The heads 85 of the bolts 84 are held in the slots 83 of the fuse block 82 such that they can't rotate (or substantially can't rotate). According to one exemplary embodiment, the slots 83 and the bolt heads 85 have a clearance of approximately 1/10 mm on either side of the bolt heads 85 and approximately 1/2 mm above and below the bolt heads 85. Bushings 86 and the ends 81 of the fuse 80 are fitted over the bolts 84. Nuts 88 are threaded onto the bolts 84 and tightened to couple the fuse 80 to the fuse block 82. Since the heads 85 of the bolts 84 are held stationary, the bolts 84 will not rotate as the nuts 88 are tightened. The bushings 86 provide a metal body between the bolt heads 85 and the nuts 88 such that, when the nuts 88 are tightened to fix the fuse 80 in place, there is a metal-to-metal contact between the bushing 86, fuse 80, bus bar 76, 78, and nut 88. Having the metal-to-metal contact ensures that there is no plastic component compressed between the metal parts to ensure a strong and reliable connection.

By using off-the-shelf bolts 84 to fasten the fuse 80 to the fuse block 82 and by using a single piece fuse block 82, the manufacturing costs of the battery system 20 may be reduced. Additionally, the slots 83 further hold the bolts 84 in place when the bushings 86 are fitted over the bolts 84 so that the fuse block 82 may be moved around (e.g., to be coupled to the BMS bracket 35) without the bolts 84 falling out.

Returning to FIG. 14, the BDU 32 further includes a first contactor 90, a second contactor 92, and a relay shown as a precharge relay 94. The contactors 90 and 92 are electrically controlled (by the BMS 34) switches that are part of the high voltage circuit of the battery system 20. The contactors 90 and 92 are normally open switches that, when they receive a signal from the BMS 34, close so that current is allowed to pass through them to complete the high voltage circuit. The first contactor 90 is provided on the positive side of the high voltage circuit and the second contactor 92 is provided on the negative side of the high voltage circuit. The precharge relay 94 operates to charge a capacitor of the battery system 20 before the contactors 90 and 92 are closed and complete the circuit.

Figure 19:
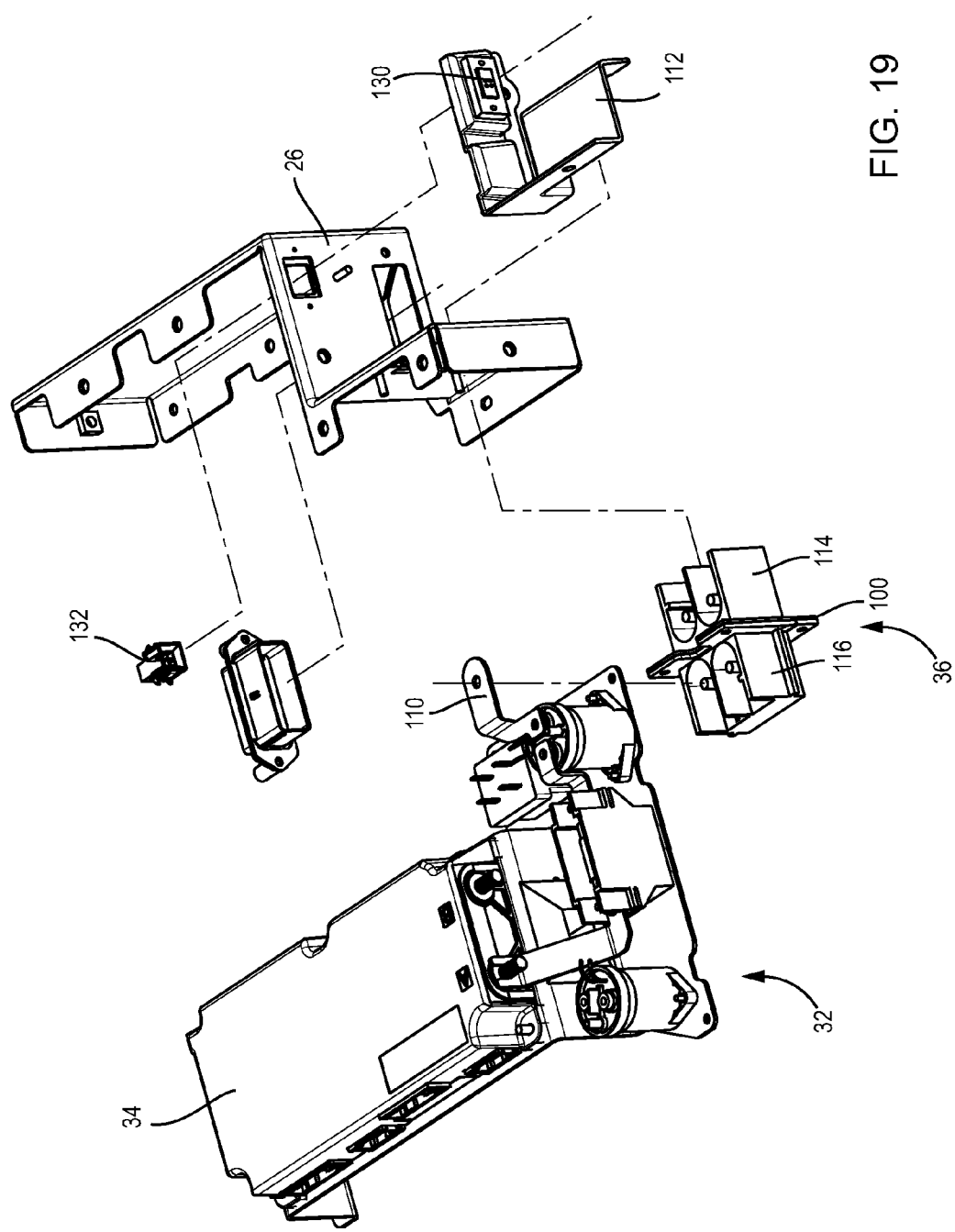
FIG. 19 is a partial exploded perspective view of a battery disconnect unit including a high voltage (HV) connector according to an exemplary embodiment.
Figure 20:
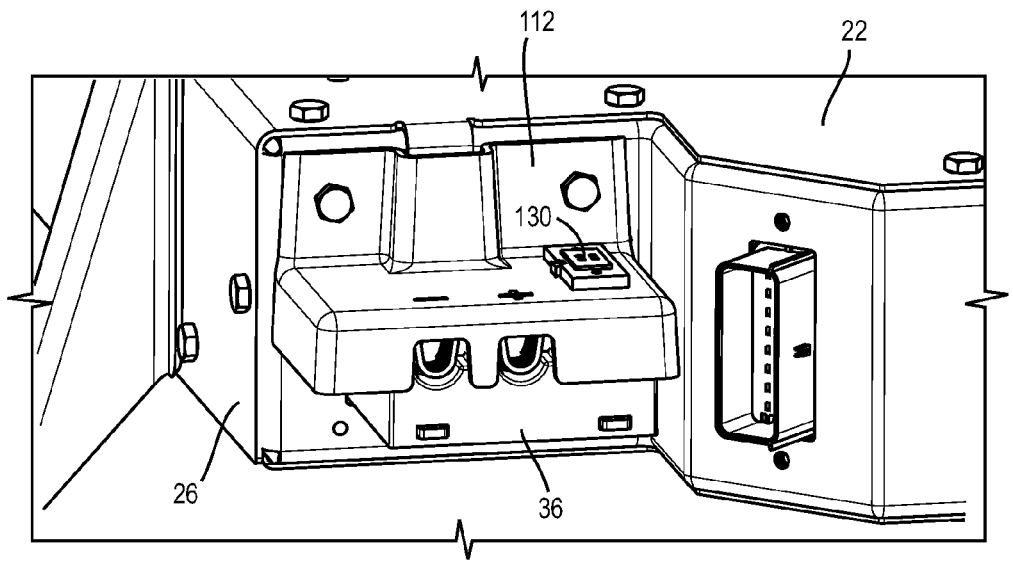
FIG. 20 is a perspective view of a high voltage connector according to another exemplary embodiment.
Figure 21:
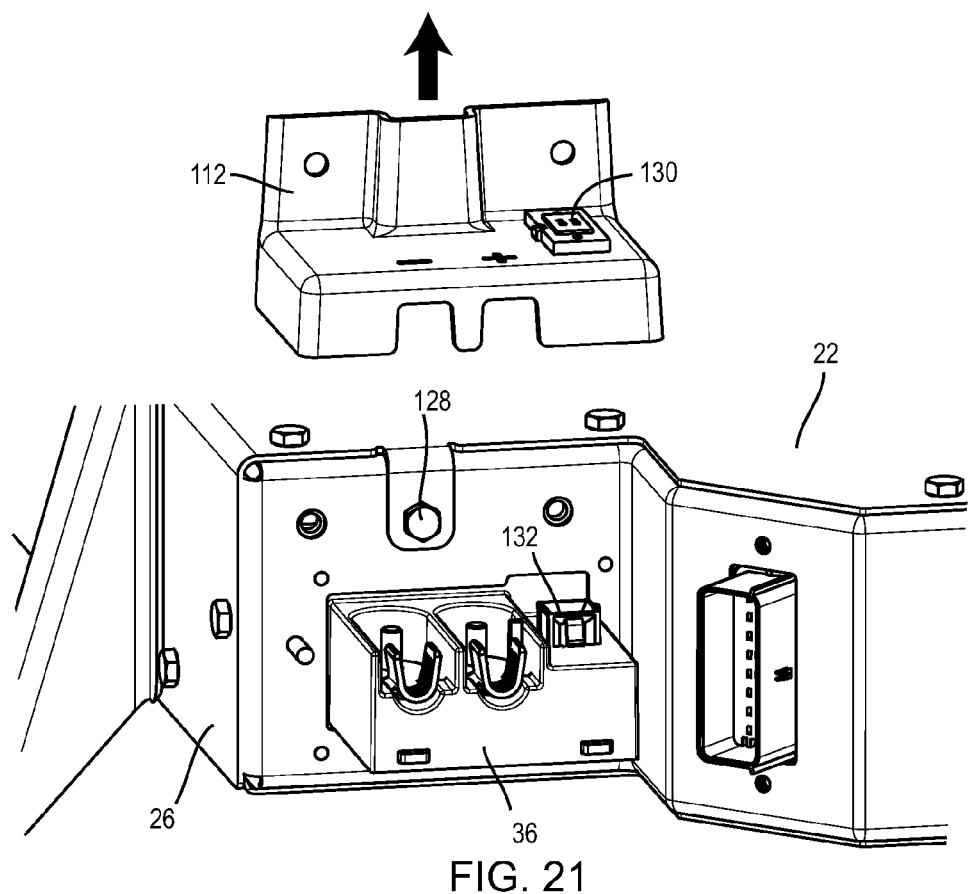
FIG. 21 is a partial exploded perspective view of the high voltage connector shown in FIG. 20.

Referring now to FIG. 19, the BDU 32 includes a high voltage connector 36 according to an exemplary embodiment. The high voltage connector 36 is electrically connected to the BMS 34 through the fuse assembly 74. The high voltage connector 36, in turn, connects the battery system 20 to the electrical system of the vehicle 10. The high voltage connector 36 bridges the electrical system inside the battery system 20 (e.g., contained within the cover 22 or other body panels shown, e.g., in FIG. 3) and the electrical system outside the battery system (e.g., external to the cover 22 or other body panels). According to the exemplary embodiment shown in FIG. 19, the high voltage connector 36 extends out of the battery system 20 through the end cap 26 on the side face of the battery system 20. According to other exemplary embodiments, the high voltage connector 36 may be provided elsewhere such as the top of the battery system 20.

Referring now to FIGS. 20-22 and 24-28, the high voltage connector 36 is shown according to another exemplary embodiment. The high voltage connector 36 includes a body 100 with an upper portion 102 and a lower portion 104, bus bars or connecting members 106 and fasteners 108 provided between the upper and lower body portions 102, 104, a cover 112 that at least partially encloses the components of the connector 36, and a disconnect mechanism 130 (such as, e.g., an interlock).

The body 100 of the high voltage connector 36 includes a first portion 116 (also referred to as the inner or interior portion) configured to extend into the battery system 20 and a second portion 114 (also referred to as an outer or exterior portion) that extends outside the battery system 20. The cover 112 of the high voltage connector 36 is configured to at least partially enclose the exterior portion 114 of the body 100. The body 100 and the cover 112 are formed from a non-conductive material such as a polymer (e.g., polyethylene, polypropylene, etc.) or other suitable material. By forming the body 100 of the high voltage connector 36 such that it extends on both sides of the cover 22 of the battery system 20, the need for hardware such as bolts and an extra assembly step to join bodies on either side of the cover 22 is eliminated.

The upper body 102 of the high voltage connector 36 includes a wall 118 dividing the interior portion 116 and the exterior portion 114. According to an exemplary embodiment, the interior portion 116 and the exterior portion 114 are formed as a single unitary body. Apertures (e.g., openings, holes, gaps, etc.) are formed on both the interior portion 116 and the exterior portion 114. The apertures are aligned with sockets 120 (e.g., hollows, bays, cavities, etc.). The sockets 120 receive bus bars 110 (e.g., contacts, conducting members, etc.) from the battery system 20 on the interior portion 116 and contacts from the vehicle's electrical system on the external portion 114. The sockets 120 are at least partially surrounded by relatively high walls 122 (e.g., features, partitions, dividers, etc.) to help prevent accidental contact between neighboring contacts to reduce the chance of short circuits. According to one exemplary embodiment, the sockets 120 include molded positive or negative symbols 124 to indicate the polarity of the contact to be received. According to other exemplary embodiments, the polarity may be otherwise indicated (e.g., with printed symbols) or may not be indicated.

The bus bars or other contacts (not shown) on the exterior portion 114 and the interior portion 116 are coupled together with connecting members 106 (e.g., bus bars, conducting members, etc.) provided between the upper body 102 and lower body 104 to complete a circuit between the vehicle electrical system and the battery system 20. The connecting members 106 are coupled to bus bars from the vehicle and from the battery system with threaded fasteners such as bolts 108 that extend through holes in the connecting members 106 and nuts (not shown) that are threaded onto the bolts 108. According to other exemplary embodiments, the connecting members 106 may be coupled together with another mechanism such as a blade connection, a pin connection, a riveted connection, or any other suitable mechanism.

The lower body 104 is coupled to the upper body 102 with fasteners such as screws (not shown). According to other exemplary embodiments, the upper body 102 and lower body 104 may be otherwise coupled together, such as with a snap-fit connection. The connecting members 106 and threaded fasteners 108 are provided between the upper body 102 and lower body 104. The lower body 104 includes bosses that form sleeves or sockets 105 to receive the fasteners 108. According to an exemplary embodiment, the sleeves 105 are hexagonal-shaped to receive the heads of fasteners 108. According to another exemplary embodiment, the sleeves 105 may have a different shape (e.g., a square shape). The sleeves 105 provide an anti-rotation feature to prevent the bolts 108 from turning when the contacts from the vehicle electrical system and the contacts from the battery system 20 are coupled to the connecting members 106. The fasteners 108 extend through openings in the connecting members 106 and openings in contacts on the exterior portion 114 and interior portion 116 of the connector 36. Nuts (not shown) are threaded onto the fasteners 108, compressing the contacts from the vehicle and the battery system against opposite ends of the connecting members 106 provided in the high voltage connector 36.

The cover 112 of the high voltage connector 36 substantially encloses the exterior portion 114 of the body 100 to reduce the chance of accidental contact between a person or object and the contacts from the vehicle electrical system. The cover 112 may further include an interlock 130 (e.g., member, contact, blade, etc.) to disconnect the battery system 20. When the cover 112 is removed, the interlock 130 is configured to send a signal to the BDU 32 to interrupt the conductive path of the battery system 20 so that electrical current will not flow through the high voltage connector 36.

Figure 23:
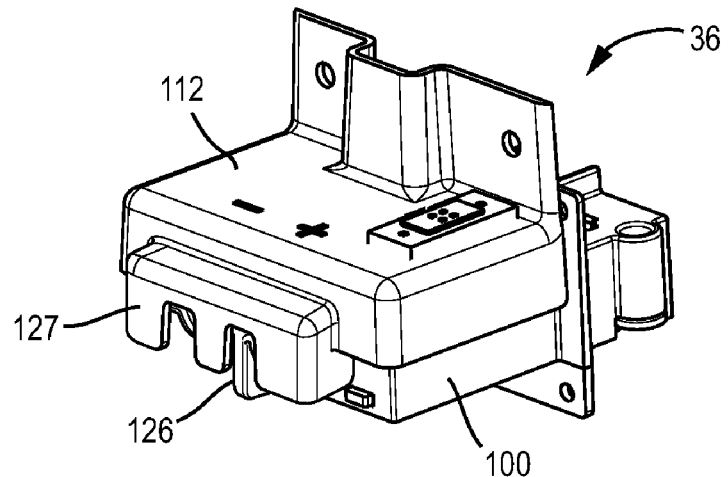
FIG. 23 is a perspective view of a high voltage connector according to another exemplary embodiment.
Figure 23A:
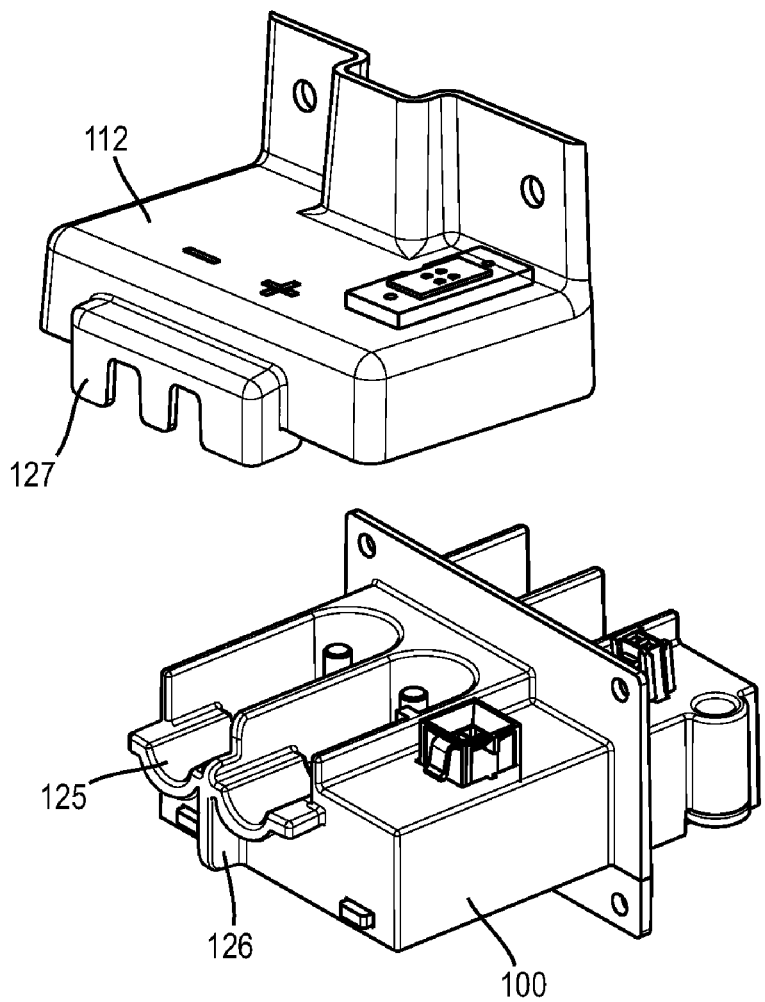
FIG. 23A is a partial exploded view of the high voltage connector shown in FIG. 23.
Figure 24:
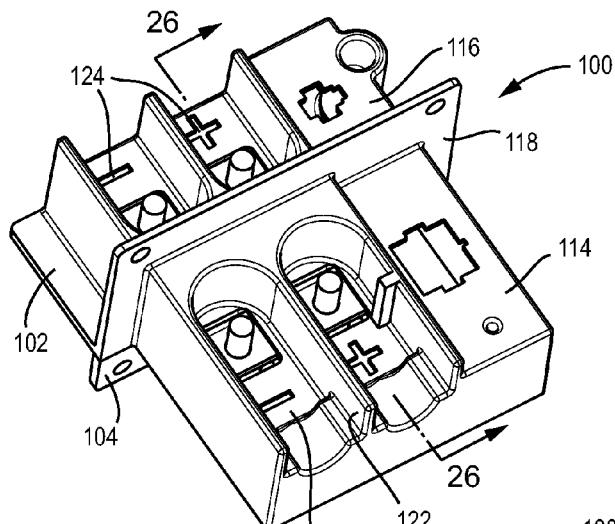
FIG. 24 is another perspective view of the high voltage connector shown in FIG. 20.
Figure 26:
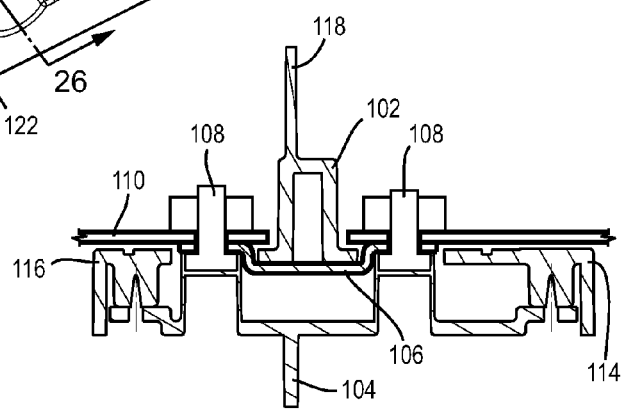
FIG. 26 is a cross-sectional view of the high voltage connector shown in FIG. 24 taken along line 26-26 of FIG. 24.
Figure 25:
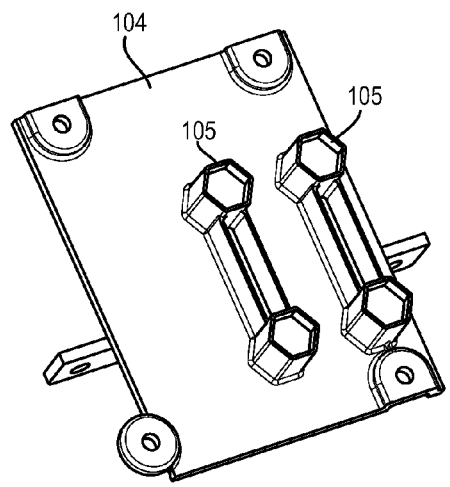
FIG. 25 is a perspective view of a lower body of the high voltage connector shown in FIG. 24 according to an exemplary embodiment.
Figure 27:
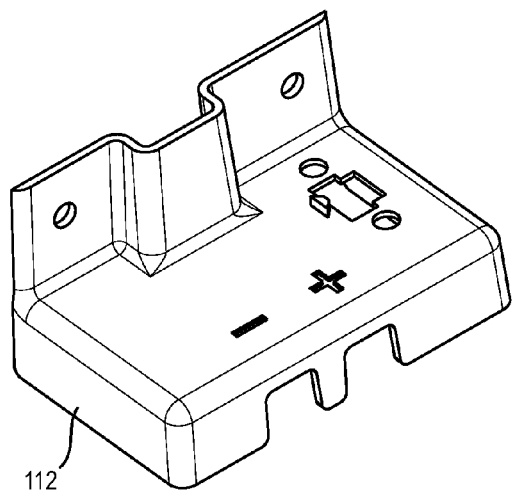
FIG. 27 is a perspective view of a cover for the high voltage connector shown in FIG. 20.
Figure 28:
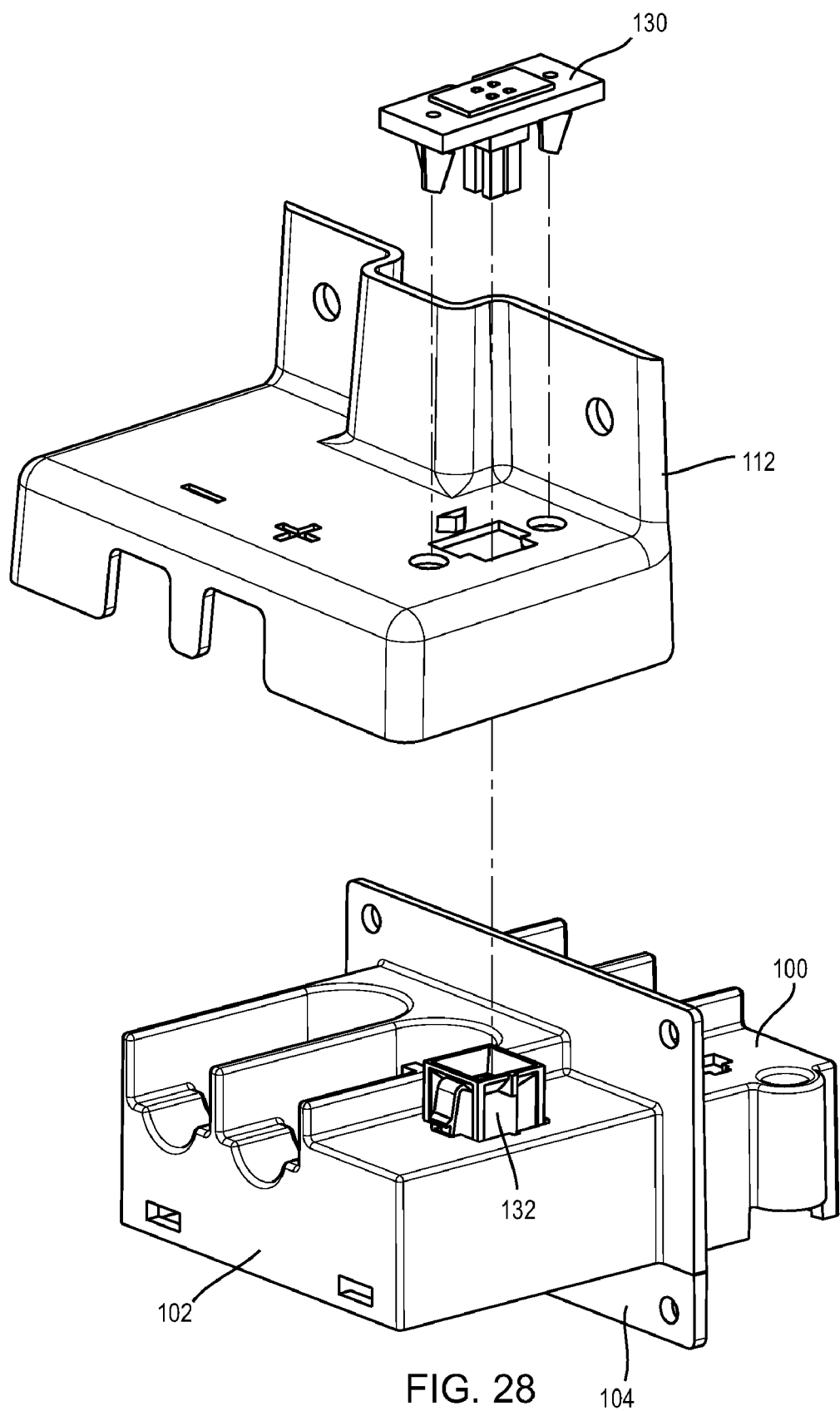
FIG. 28 is a partial exploded view of the high voltage connector shown in FIG. 22 including an interlock according to an exemplary embodiment.

Referring now to FIGS. 23 and 23A, a high voltage connector 36 is shown according to another exemplary embodiment. The body 100 and the cover 112 include extensions 125, 127 that extend outward and away from the high voltage connector 36. A member or element provided in the form of a protrusion or rib 126 provides enhanced structural rigidity for the body extension 125. One advantageous feature of providing extensions 125, 127 from the body 100 and the cover 112 is that there is additional distance between the exterior of the high voltage connector 36 and the point at which exposed conductive portions of battery cables are coupled to the high voltage connector 36. In this manner, the extensions 125, 127 function to provide a cover or shroud for at least a portion of battery cables (not shown) that are coupled to the high voltage connector 36.

Returning to FIGS. 20 and 21, the cover 112 may be configured to conceal at least one of the fasteners 128 used to fasten the battery system housing (e.g., fasten the end cap 26 to the cover 22). The cover 112 must be removed to access the concealed fasteners 128. Removing the cover 112 to access the fasteners 128 disconnects the interlock 130, causing the BDU 32 to disconnect the battery system 20. In this way the battery system 20 is shut down before the cover 22 of the battery system 20 can be removed. When the high voltage cover 112 is put back into position on the high voltage connector 36, the interlock 130 again makes contact with or connects to the interlock connector 132 to complete the circuit. With the circuit completed, the BDU 32 reconnects the battery system 20, allowing current to flow through the high voltage connector 36.

Figure 22:
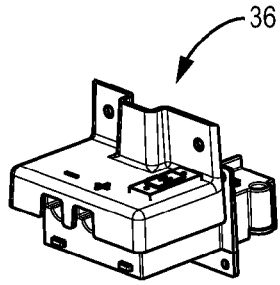
FIG. 22 is a perspective view of the high voltage connector shown in FIG. 20.
Figure 22A:
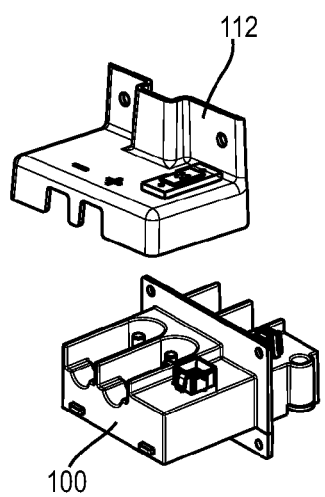
FIG. 22A is a partial exploded perspective view of the high voltage connector shown in FIG. 22.
Figure 22B:
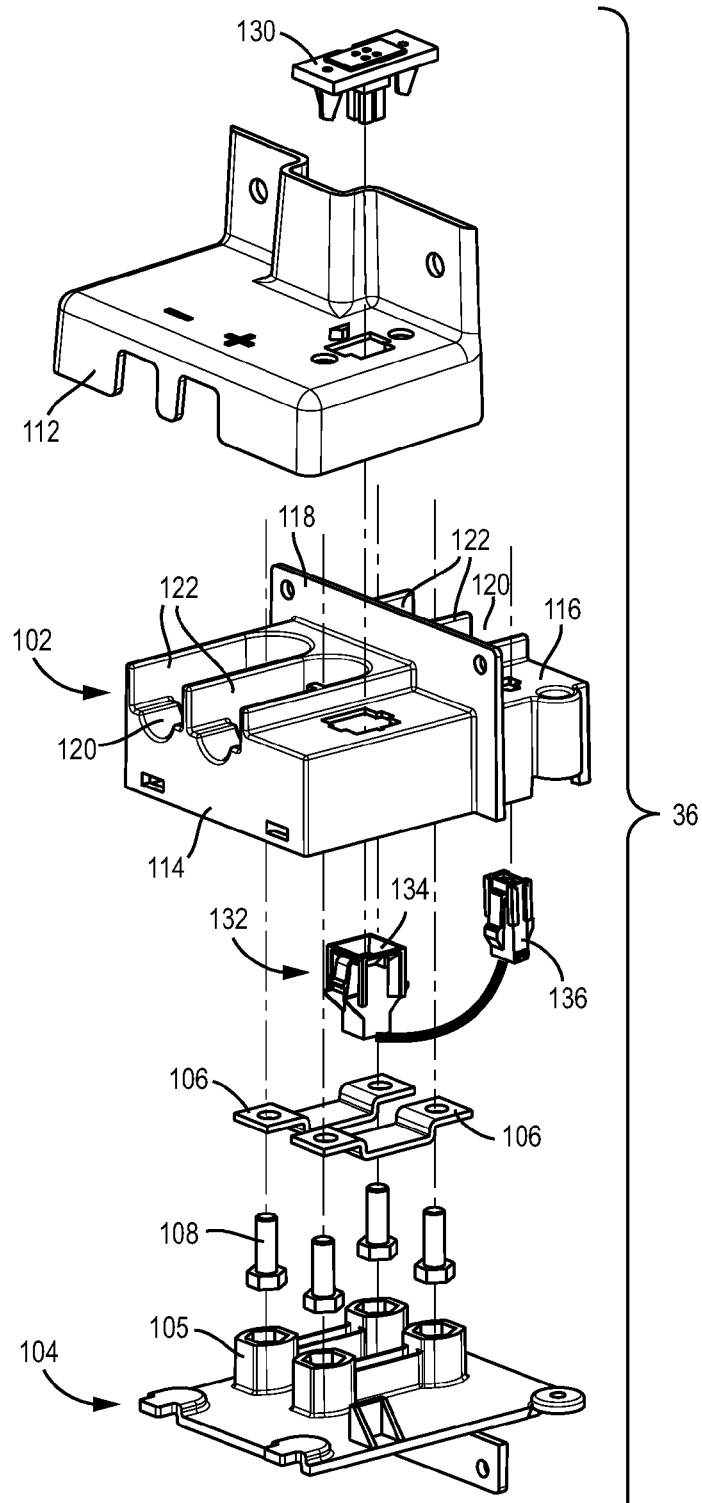
FIG. 22B is an exploded view of the high voltage connector shown in FIG. 22.

Referring now to FIG. 22B, the interlock connector 132 is provided between the upper body 102 and the lower body 104, with a 4-pin connector 134 extending through the upper body 102 on the exterior side 114 of the high voltage connector 36 and a 2-pin connector 136 extending through the upper body 102 on the interior side 116 of the high voltage connector 36. The 4-pin connector 134 engages the interlock 130, which is coupled to the high voltage cover 112. The 2-pin connector 136 is coupled to the BDU 32 with a data cable (not shown).

The interlock 130 and interlock connector 132 may be provided in a variety of locations and orientations on the battery system 20 to provide a disconnect function when the cover 22 is removed. As shown in FIG. 19, the interlock connector 132 may be coupled to the battery system cover 22 while the interlock 130 is coupled to the high voltage cover 112. As shown in FIGS. 20-28, the interlock connector 132 may be coupled to the high voltage connector 36 while the interlock 130 is coupled to the high voltage cover 112. According to other exemplary embodiments, the interlock 130 and the interlock connector 132 may be otherwise coupled to the battery system 20 such that they disconnect when the high voltage cover 112 is removed, exposing the high voltage connector 36.

Figure 29:
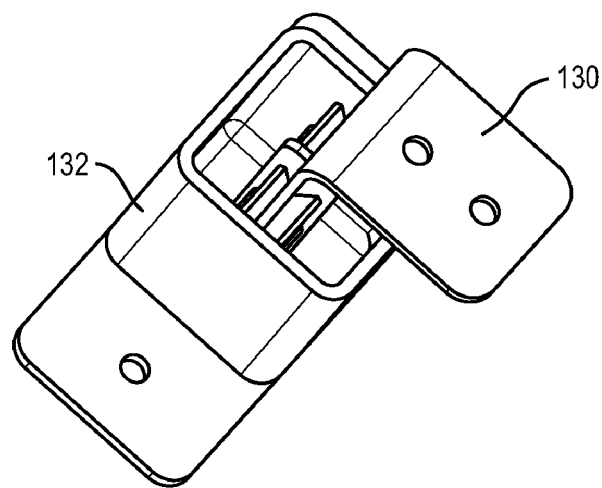
FIG. 29 is a perspective view of an interlock and a connector according to another exemplary embodiment.
Figure 30:
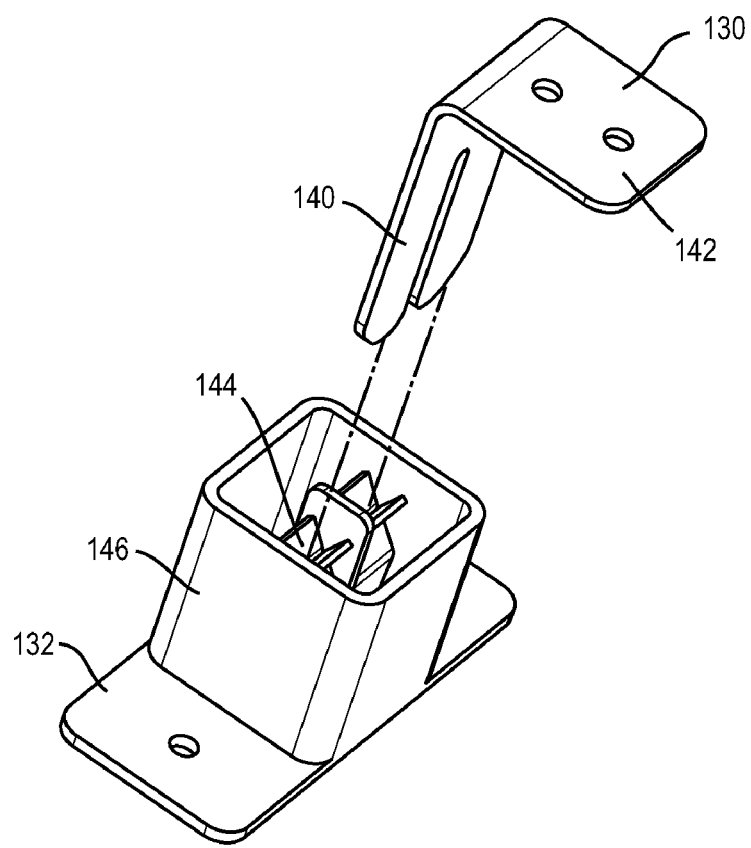
FIG. 30 is an exploded view of the interlock and connector shown in FIG. 29.

While the interlock 130 shown in FIGS. 19-28 is a connector commercially available from Molex of Lisle, Ill., according to other embodiments, the interlock 130 may be any suitable mechanism that completes a circuit when the high voltage cover 112 is in place and breaks the circuit when the cover 112 is removed. For example, as shown in FIGS. 29-30, the interlock 130 and the interlock connector 132 may engage with each other with a blade-type connection. The interlock 130 includes a contact or blade portion 140 and a mounting portion 142. The blade 140 includes two protruding portions (e.g., extensions, etc.) that engage with contacts 144 on the interlock connector. According to other exemplary embodiments, the blade 140 may have more or fewer protruding portions (e.g., a single protruding portion may contact both contacts on the connector. The contacts 144 on the interlock connector 132 may be spring-type contacts and may be housed in a main body or housing 146 of the interlock connector 132. Similar to the embodiments in FIGS. 19-28, the interlock 130 is coupled to the high voltage cover 112 while the interlock connector 132 is coupled to another component such as the battery system cover 22 or the high voltage connector 36.

According to any of the above embodiments, the interlock connector 132 may be coupled to the battery system 20 or to the high voltage connector 36 with a snap fit connection. In other embodiments, the interlock connector 132 may be coupled using fasteners such as screws or rivets. Similarly, the interlock 130 may be coupled to the cover 112 of the high voltage connector 36 with a snap fit connection or may be coupled using fasteners such as screws or rivets. In another embodiment, the interlock 130 may be coupled to the high voltage connector 36 and the interlock connector 132 may be coupled to the cover 112 of the high voltage connector 36. According to other exemplary embodiments, the interlock 130 may have another mechanism such as a bayonet-type connection or a pin-type connection.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the battery system as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A high voltage connector for a battery system comprising:
    an upper body having a first portion and a second portion, the first portion of the upper body located internal to a battery system housing and configured to receive at least one contact from the battery system, the second portion located external to the battery system housing and configured to receive at least one contact from a vehicle;
    a lower body coupled to the upper body; and
    at least one connecting member provided between the upper body and the lower body, the connecting member configured to conductively connect the contact of the battery system to the contact of the vehicle.

2. The high voltage connector of claim 1, further comprising a first fastener at a first end of the connecting member and a second fastener at a second end of the connecting member.

3. The high voltage connector of claim 2, wherein the lower body comprises a socket configured to receive a first end of the first fastener such that the socket substantially restricts rotational movement of the first fastener.

4. The high voltage connector of claim 3, wherein the socket is at least one of a square shape and a hexagonal shape.

5. The high voltage connector of claim 1, wherein the upper body comprises features configured to partially surround the contact of the battery system and the contact of the vehicle when the contact of the battery system and the contact of the vehicle are coupled to the at least one connecting member.

6. The high voltage connector of claim 1, comprising a first connecting member and a second connecting member, wherein the first connecting member is a positive contact and the second connecting member is a negative contact.

7. The high voltage connector of claim 1, further comprising a cover configured to substantially enclose the second portion of the upper body to reduce the chance of accidental contact with the contact of the vehicle.

8. The high voltage connector of claim 7, wherein the cover comprises an extension to provide additional coverage of the contact of the vehicle.

9. The high voltage connector of claim 7, wherein the upper body comprises a first contact and the cover comprises a second contact such that when the cover is removed from the upper body, the second contact disengages from the first contact.

10. The high voltage connector of claim 7, wherein the cover substantially conceals a fastener used to retain a cover on the battery system.

11. A high voltage connector for a battery system comprising:
    a first member comprising an interior portion extending into the battery system and an exterior portion extending out of the battery system;
    at least one bus bar configured to conductively connect a contact of the battery system with a contact of a vehicle; and
    a second member coupled to the first member to sandwich the at least one bus bar between the first member and the second member.

12. The high voltage connector of claim 11, further comprising a first fastener at a first end of the bus bar and a second fastener at a second end of the bus bar.

13. The high voltage connector of claim 12, wherein the second member comprises a socket configured to receive a first end of the first fastener such that the socket substantially restricts rotational movement of the first fastener.

14. The high voltage connector of claim 13, wherein the socket is at least one of a square shape and a hexagonal shape.

15. The high voltage connector of claim 11, wherein the first member comprises features configured to partially surround the contact of the battery system and the contact of the vehicle when the contact of the battery system and the contact of the vehicle are coupled to the at least one bus bar.

16. The high voltage connector of claim 11, comprising a first bus bar and a second bus bar, wherein the first bus bar is a positive contact and the second bus bar is a negative contact.

17. The high voltage connector of claim 11, further comprising a cover configured to substantially enclose the exterior portion of the first member to reduce the chance of accidental contact with the contact of the vehicle.

18. The high voltage connector of claim 17, wherein the cover comprises an extension to provide additional coverage of the contact of the vehicle.

19. The high voltage connector of claim 17, wherein the first member comprises a first contact and the cover comprises a second contact such that when the cover is removed from the first member, the second contact disengages from the first contact.

20. The high voltage connector of claim 17, wherein the cover substantially conceals a fastener used to retain a cover on the battery system.

* * * * *